(12) United States Patent
Lim et al.

(10) Patent No.: US 12,498,821 B2
(45) Date of Patent: *Dec. 16, 2025

(54) DISPLAY DEVICE CAPABLE OF SENSING A USER INPUT ACCURATELY AND OPERATING METHOD THEREOF

(71) Applicant: Samsung Display Co., Ltd., Yongin-Si (KR)

(72) Inventors: Sanghyun Lim, Cheonan-si (KR); Youngsik Kim, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/614,749

(22) Filed: Mar. 25, 2024

(65) Prior Publication Data

US 2024/0231536 A1    Jul. 11, 2024

Related U.S. Application Data

(63) Continuation of application No. 18/092,342, filed on Jan. 2, 2023, now Pat. No. 11,966,535.

(30) Foreign Application Priority Data

Mar. 10, 2022   (KR) .................. 10-2022-0030089

(51) Int. Cl.
*G06F 3/041* (2006.01)
*G06F 3/044* (2006.01)

(52) U.S. Cl.
CPC ...... *G06F 3/04166* (2019.05); *G06F 3/04164* (2019.05); *G06F 3/0446* (2019.05)

(58) Field of Classification Search
CPC .... G06F 3/041; G06F 3/0412; G06F 3/04164; G06F 3/04166; G06F 3/0443; G06F 3/0446

See application file for complete search history.

(56) References Cited

U.S. PATENT DOCUMENTS 8,860,692 B2   10/2014  Kim et al.
9,916,055 B2   3/2018   Ahn et al.
(Continued)

FOREIGN PATENT DOCUMENTS

KR   10-2019-0100997 A   8/2019
KR   10-2020-0009923 A   1/2020
KR   10-2021-0085356 A   7/2021

*Primary Examiner* — Chun-Nan Lin
(74) *Attorney, Agent, or Firm* — Innovation Counsel LLP

(57) ABSTRACT

Disclosed is a display device including a display panel, an input sensor that is disposed on the display panel and that includes sensing electrodes, a master readout circuit that is electrically connected with a first portion of the sensing electrodes and that generates first reception signals corresponding to a signal received from the first portion of the sensing electrodes, and a slave readout circuit that is electrically connected with the a second portion of the sensing electrodes and that generates second reception signals corresponding to a signal received from the second portion of the sensing electrodes. The master readout circuit provides a synchronization signal to the slave readout circuit, and the slave readout circuit operates in response to the synchronization signal and provides a sensing signal corresponding to the second reception signals to the master readout circuit.

19 Claims, 12 Drawing Sheets

(56) References Cited

U.S. PATENT DOCUMENTS

| | | |
|---|---|---|
| 10,811,471 B2 | 10/2020 | Jeon et al. |
| 10,936,132 B2 | 3/2021 | Jang |
| 10,969,911 B2 | 4/2021 | Kim et al. |
| 10,971,562 B2 | 4/2021 | Lee et al. |
| 11,023,066 B2 | 6/2021 | Kim |
| 11,226,702 B2 | 1/2022 | Lee et al. |
| 2015/0041628 A1* | 2/2015 | Goh ............... G06F 3/0412 250/214 R |
| 2017/0168615 A1 | 6/2017 | Huang |
| 2017/0287991 A1* | 10/2017 | Goh ............... G06F 3/0412 |
| 2021/0149474 A1* | 5/2021 | Choi ............... G06F 3/0412 |
| 2021/0287584 A1 | 9/2021 | Choi et al. |
| 2021/0405794 A1 | 12/2021 | Shepelev et al. |
| 2022/0165211 A1 | 5/2022 | Jo et al. |
| 2022/0181394 A1 | 6/2022 | Moon et al. |
| 2022/0197467 A1 | 6/2022 | Kim et al. |
| 2022/0236850 A1 | 7/2022 | Lee |
| 2022/0413697 A1 | 12/2022 | Kim et al. |
| 2023/0134476 A1* | 5/2023 | Jung ............... G09G 3/3696 345/173 |
| 2023/0205348 A1* | 6/2023 | Jung ............... G06F 3/04166 345/173 |

\* cited by examiner

DISPLAY DEVICE CAPABLE OF SENSING A USER INPUT ACCURATELY AND OPERATING METHOD THEREOF

CROSS-REFERENCE TO RELATED APPLICATIONS

This application is a Continuation Application of U.S. patent application Ser. No. 18/092,342 filed on Jan. 2, 2023, which claims priority under 35 U.S.C. § 119 to Korean Patent Application No. 10-2022-0030089 filed on Mar. 10, 2022, in the Korean Intellectual Property Office, the disclosures of which are incorporated by reference herein in their entireties.

BACKGROUND

Embodiments of the present disclosure described herein relate to a display device.

Multimedia electronic devices, such as a television, a mobile phone, a tablet computer, a car navigation device, a game machine, and the like, include a display device for displaying an image. The electronic devices may include a display device capable of providing a touch-based input method that enables a user to intuitively input information or instructions in an easy and simple manner, in addition to a conventional input method such as a button, a keyboard, a mouse, or the like.

SUMMARY

Embodiments of the present disclosure provide a display device for more accurately sensing a user input and an operating method thereof.

According to an embodiment, a display device includes a display panel, an input sensor that is disposed on the display panel and that includes sensing electrodes, a master readout circuit electrically connected with a first portion of the sensing electrodes among the sensing electrodes and generating first reception signals corresponding to signals received from the first portion of the sensing electrodes, and a slave readout circuit electrically connected with a second portion of the sensing electrodes among the sensing electrodes and generating second reception signals corresponding to signals received from the second portion of the sensing electrodes. The master readout circuit provides a synchronization signal to the slave readout circuit, and the slave readout circuit operates in response to the synchronization signal and provides a sensing signal corresponding to the second reception signals to the master readout circuit.

In an embodiment, the master readout circuit may calculate a position of an input on the input sensor, based on the first reception signals and the second reception signals.

In an embodiment, the master readout circuit may include a host interface that communicates with a host processor and a sensor interface that communicates with the slave readout circuit.

In an embodiment, the slave readout circuit may include a sensor interface that communicates with the master readout circuit.

In an embodiment, the input sensor may include a sensing area in which the sensing electrodes are arranged, a first non-sensing area disposed on a periphery of the sensing area, and a second non-sensing area disposed to be spaced apart from the first non-sensing area with the sensing area disposed between the first non-sensing area and the second non-sensing area.

In an embodiment, the display device may further include first sensing lines that electrically connect the first portion of the sensing electrodes and the master readout circuit and second sensing lines that electrically connect the second portion of the sensing electrodes and the slave readout circuit.

In an embodiment, the first sensing lines may be disposed in the first non-sensing area, and the second sensing lines may be disposed in the second non-sensing area.

In an embodiment, the display device may further include a circuit board on which the master readout circuit and the slave readout circuit are disposed, and the circuit board may be electrically connected with the display panel.

In an embodiment, the display device may further include a first circuit board on which the master readout circuit is disposed and a second circuit board on which the slave readout circuit is disposed. The first circuit board may be electrically connected to a first side of the display panel, and the second circuit board may be electrically connected to a second side of the display panel, the second side being different from the first side.

In an embodiment, the master readout circuit disposed on the first circuit board and the slave readout circuit disposed on the second circuit board may be electrically connected through a connecting part.

According to an embodiment, a display device includes a display panel, an input sensor that is disposed on the display panel and that includes first sensing electrodes and second sensing electrodes, a master readout circuit which transmits first transmission signals to a first portion of the first sensing electrodes among the first sensing electrodes and receive first reception signals from a first portion of the second sensing electrodes among the second sensing electrode, and a slave readout circuit which transmits a second transmission signal to a second portion of the first sensing electrodes among the first sensing electrodes and receive second reception signals from a second portion of the second sensing electrodes among the second sensing electrodes. The master readout circuit provides a synchronization signal to the slave readout circuit, and in response to the synchronization signal, the slave readout circuit transmits the second transmission signal, receives the second reception signals, and provides a sensing signal corresponding to the second reception signals to the master readout circuit.

In an embodiment, the master readout circuit may calculate a position of an input on the input sensor, based on the first reception signals and the second reception signals.

In an embodiment, the input sensor may include a sensing area in which the first and second sensing electrodes are arranged, a first non-sensing area disposed on a periphery of the sensing area, and a second non-sensing area disposed to be spaced apart from the first non-sensing area with the sensing area disposed between the first non-sensing area and the second non-sensing area.

In an embodiment, the display device may further include first sensing lines which electrically connects the first portion of the second sensing electrodes and the master readout circuit and second sensing lines which electrically connects the second portion of the second sensing electrodes and the slave readout circuit.

In an embodiment, the first sensing lines may be disposed in the first non-sensing area and the second sensing lines may be disposed in the second non-sensing area.

In an embodiment, the display device may further include a circuit board on which the master readout circuit and the slave readout circuit are disposed, and the circuit board may be electrically connected with the display panel.

In an embodiment, the display device may further include a first circuit board on which the master readout circuit is disposed, a second circuit board on which the slave readout circuit is disposed, and a connecting part that electrically connects the first circuit board and the second circuit board. The first circuit board may be electrically connected to a first side of the display panel and the second circuit board may be electrically connected to a second side of the display panel, the second side being different from the first side.

In an embodiment, the master readout circuit may include a first transmitting circuit that outputs the first transmission signals to the first portion of the first sensing electrodes, a first receiving circuit that receives the first reception signals from the first portion of the second sensing electrodes, a first memory that stores the first reception signals, a host interface that communicates with a host processor, a first sensor interface that transmits the synchronization signal to the slave readout circuit, and a first processor that controls the first transmitting circuit, the first memory, the host interface, and the first sensor interface.

In an embodiment, the slave readout circuit may include a second transmitting circuit that outputs the second transmission signals to the second portion of the first sensing electrodes, a second receiving circuit that receives the second reception signals from the second portion of the second sensing electrodes, a second memory that stores the second reception signals, a second sensor interface that transmits the sensing signal corresponding to the second reception signals stored in the second memory to the first sensor interface of the master readout circuit, and a second processor that controls the second transmitting circuit, the second memory, and the second sensor interface.

According to an embodiment, a method for operating a display device includes transmitting a synchronization signal from a master readout circuit to a slave readout circuit, transmitting a first transmission signal from the master readout circuit to an input sensor, receiving, by the master readout circuit, a first input signal for the first transmission signal from the input sensor, receiving, by the slave readout circuit, a second input signal for the first transmission signal from the input sensor, transmitting a second transmission signal from the slave readout circuit to the input sensor, receiving, by the master readout circuit, the first input signal for the second transmission signal from the input sensor, receiving, by the slave readout circuit, the second input signal for the second transmission signal from the input sensor, transmitting a sensing signal corresponding to the second input signal for the first transmission signal and the second input signal for the second transmission signal from the slave readout circuit to the master readout circuit, and calculating, by the master readout circuit, a position of a touch corresponding to the first input signal and the second input signal for the first transmission signal and the second transmission signal.

BRIEF DESCRIPTION OF THE DRAWINGS

The above and other objects and features of the present disclosure will become apparent by describing in detail embodiments thereof with reference to the accompanying drawings.

DETAILED DESCRIPTION

Figure 1:
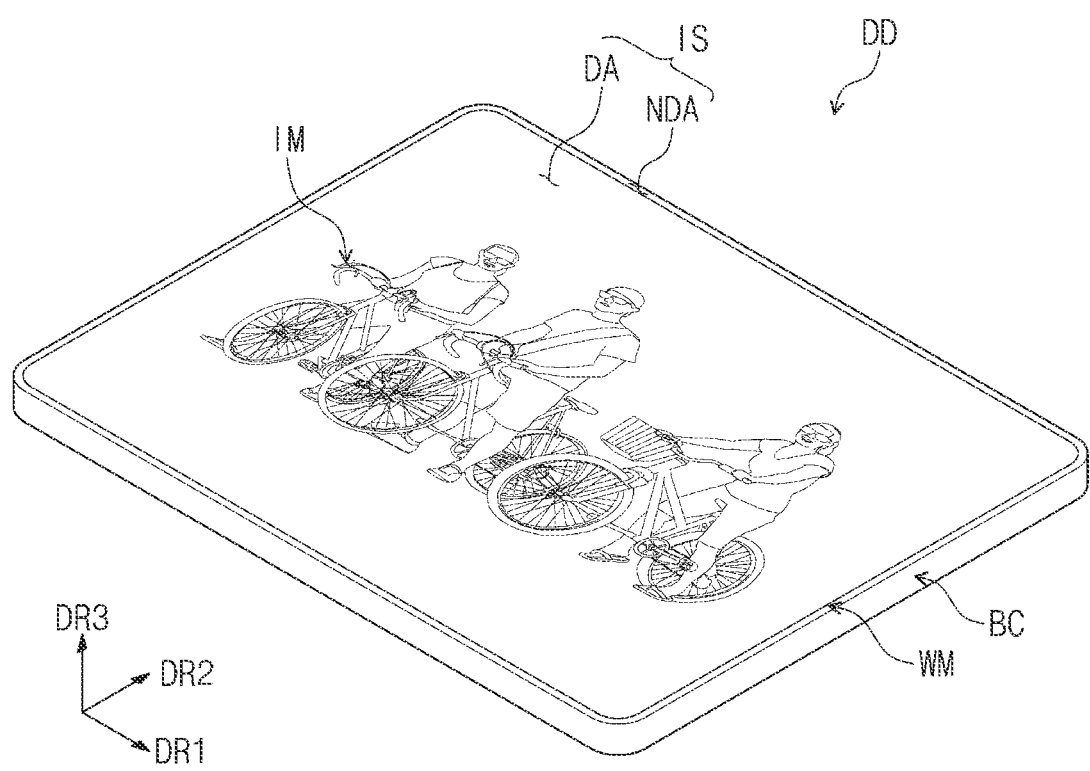
FIG. 1 is a perspective view of a display device according to an embodiment of the present disclosure.

In this specification, when it is mentioned that a component (or, an area, a layer, a part, etc.) is referred to as being "on", "connected to" or "coupled to" another component, this means that the component may be directly on, connected to, or coupled to the other component or a third component may be present therebetween.

Identical reference numerals refer to identical components. Additionally, in the drawings, the thicknesses, proportions, and dimensions of components are exaggerated for effective description. As used herein, the term "and/or" includes all of one or more combinations defined by related components.

Terms such as first, second, and the like may be used to describe various components, but the components should not be limited by the terms. The terms may be used only for distinguishing one component from other components. For example, without departing the scope of the present disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to the accompanying drawings.

Figure 2:
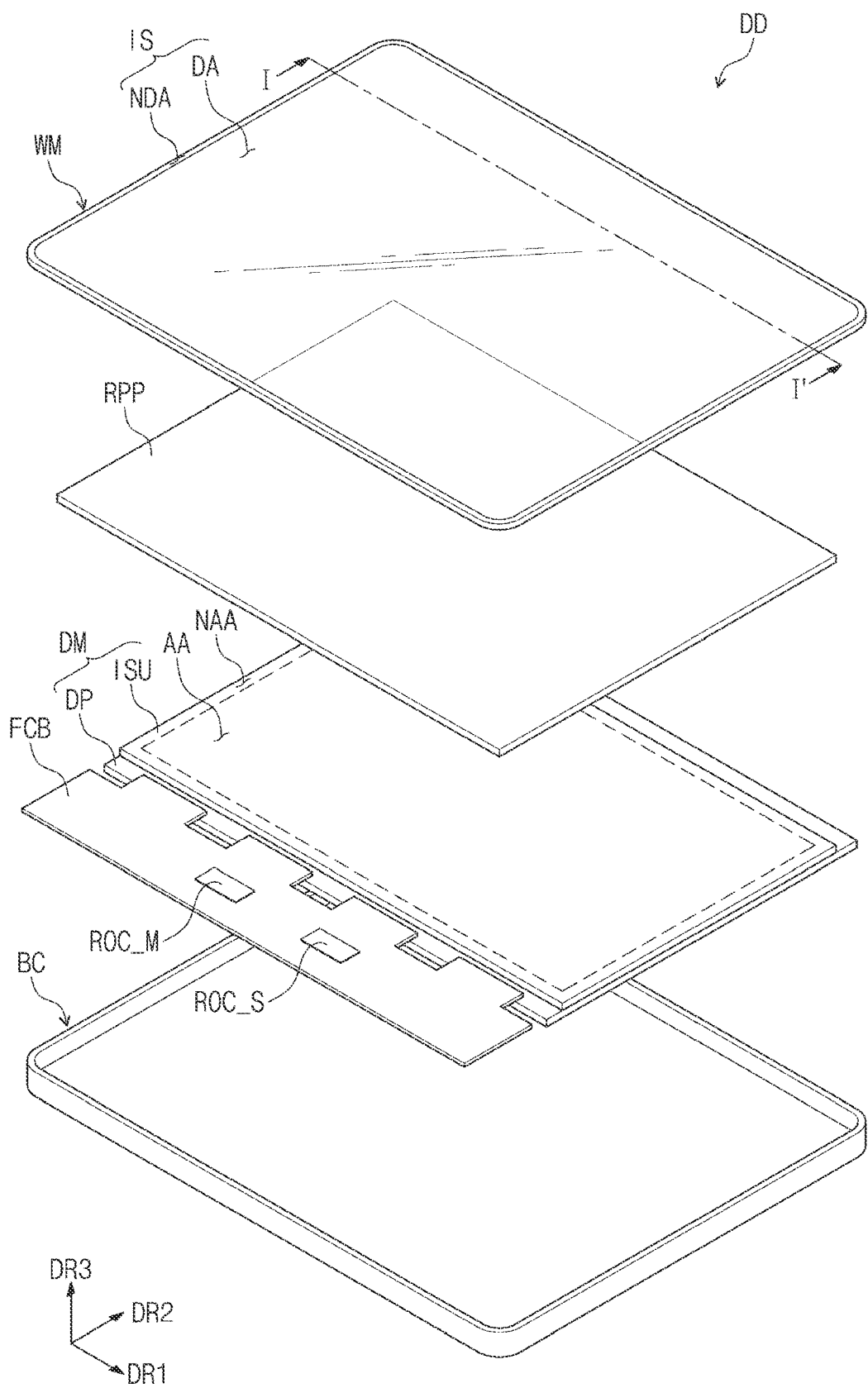
FIG. 2 is an exploded perspective view of the display device according to an embodiment of the present disclosure.

FIG. 1 is a perspective view of a display device according to an embodiment of the present disclosure, and FIG. 2 is an exploded perspective view of the display device according to an embodiment of the present disclosure.

Referring to FIGS. 1 and 2, the display device DD may be a device activated in response to an electrical signal. The display device DD according to the present disclosure may be a large display device such as a television, a monitor, or the like, or may be a small and medium-sized display device such as a mobile phone, a tablet computer, a car navigation device, a game machine, or the like. These are merely illustrative, and the display device DD may include other forms of display devices as long as the display devices do not deviate from the spirit and scope of the present disclosure. The display device DD has a rectangular shape with long sides in a first direction DR1 and short sides in a second direction DR2 crossing the first direction DR1. However, the configuration of the display device DD is not limited thereto, the display device DD may have various shapes. The display device DD may display an image IM in a third direction DR3 on a display surface IS parallel to a plane formed by the first direction DR1 and the second direction DR2. The display surface IS on which the image IM is displayed may correspond to the front surface of the display device DD.

In this embodiment, front surfaces (or, upper surfaces) and rear surfaces (or, lower surfaces) of layer constituents are defined based on the direction in which the image IM is displayed. The front surfaces and the rear surfaces may be opposite each other in the third direction DR3, and the normal directions of the front surfaces and the rear surfaces may be parallel to the third direction DR3.

The separation distance between the front surface and the rear surface of the display device DD in the third direction DR3 may correspond to the thickness of the display device DD in the third direction DR3. Meanwhile, the directions indicated by the first, second, and third directions DR1, DR2, and DR3 may be relative concepts and may be changed to different directions.

The display device DD may sense an external input applied from the outside.

The external input may include various forms of inputs provided from outside the display device DD. The display device DD according to an embodiment of the present disclosure may sense a user's external input applied from the outside. The user's external input may be one of various forms of external inputs such as a part of the user's body, light, heat, gaze, and pressure, or a combination thereof. In addition, the display device DD may sense the user's external input applied to the side surface or the rear surface of the display device DD depending on the structure of the display device DD and is not limited to any one embodiment. In an embodiment of the present disclosure, the external input may include an input by an input device (e.g., a stylus pen, an active pen, a touch pen, an electronic pen, an e-pen, or the like).

The display surface IS of the display device DD may include a display area DA and a non-display area NDA. The display area DA may be an area on which the image IM is displayed. The user views the image IM through the display area DA. In this embodiment, the display area DA is illustrated in a rounded rectangular shape. However, this is illustrative, and the display area DA may have various shapes and is not limited to any one embodiment.

The non-display area NDA is disposed adjacent to the display area DA. The non-display area NDA may have a predetermined color. The non-display area NDA may surround the display area DA. Accordingly, the shape of the display area DA may be substantially defined by the non-display area NDA. However, this is illustrative, and the non-display area NDA may be disposed adjacent to only one side of the display area DA, or may be omitted. The display device DD according to an embodiment of the present disclosure may include various embodiments and is not limited to any one embodiment.

As illustrated in FIG. 2, the display device DD may include a display module DM and a window WM disposed over the display module DM. The display module DM may include a display panel DP and an input sensor ISU.

The display panel DP according to an embodiment of the present disclosure may be an emissive display panel. For example, the display panel DP may be an organic light emitting display panel, an inorganic light emitting display panel, or a quantum-dot light emitting display panel. An emissive layer of the organic light emitting display panel may contain an organic light emitting material. An emissive layer of the inorganic light emitting display panel may contain an inorganic light emitting material. An emissive layer of the quantum-dot light emitting display panel may contain quantum dots, quantum rods, and the like. Hereinafter, it will be exemplified that the display panel DP is an organic light emitting display panel.

The display panel DP may output the image IM, and the output image IM may be displayed through the display surface IS.

The input sensor ISU may be disposed on the display panel DP and may sense an external input. The input sensor ISU may be directly disposed on the display panel DP. According to an embodiment of the present disclosure, the input sensor ISU may be directly formed on the display panel DP by a continuous process. That is, when the input sensor ISU is directly disposed on the display panel DP, an internal adhesive film (not illustrated) is not disposed between the input sensor ISU and the display panel DP. However, the internal adhesive film may be disposed between the input sensor ISU and the display panel DP. In this case, the input sensor ISU may not be manufactured together with the display panel DP by the continuous process and may be manufactured separately from the display panel DP and then fixed to the upper surface of the display panel DP by the internal adhesive film.

The window WM may be formed of a transparent material through which the image IM is able to be output. For example, the window WM may be formed of glass, sapphire, plastic, or the like. Although the window WM is illustrated as a single layer, the window WM is not limited thereto and may include a plurality of layers.

Meanwhile, although not illustrated, the above-described non-display area NDA of the display device DD may be formed by printing a material having a predetermined color on one area of the window WM. In an embodiment of the present disclosure, the window WM may include a light blocking pattern for defining the non-display area NDA. The light blocking pattern may be a colored organic film. For example, the light blocking pattern may be formed by coating.

The window WM may be coupled to the display module DM through an adhesive film. In an embodiment of the present disclosure, the adhesive film may include an optically clear adhesive (OCA) film. However, without being limited thereto, the adhesive film may include a conventional adhesive or sticky substance. For example, the adhesive film may include an optically clear resin (OCR) or a pressure sensitive adhesive (PSA) film.

An anti-reflector RPP may be additionally disposed between the window WM and the display module DM. The anti-reflector RPP decreases the reflectivity of external light incident from above the window WM. The anti-reflector RPP according to an embodiment of the present disclosure may include a phase retarder and a polarizer. In an embodiment, the anti-reflector RPP may include color filters. The arrangement of the color filters may be determined in consideration of the colors of light generated by a plurality of pixels PX (refer to FIG. 5) included in the display panel DP. The anti-reflector RPP may further include a light blocking pattern. In an embodiment of the present disclosure, the anti-reflector RPP may be omitted, or may be embedded in the display module DM.

The display module DM may display the image IM in response to an electrical signal and may transmit/receive information about an external input. The display module DM may include an active area AA and a peripheral area NAA. The active area AA may be defined as an area that outputs the image IM provided by display module DM. Furthermore, the active area AA may be defined as an area where the input sensor ISU senses an external input applied from the outside.

The peripheral area NAA is disposed adjacent to the active area AA. For example, the peripheral area NAA may surround the active area AA. However, this is illustrative, and the peripheral area NAA may be defined in various shapes and is not limited to any one embodiment. According to an embodiment, the active area AA of the display module DM may correspond to at least a portion of the display area DA.

The display module DM may further include a circuit board FCB. The circuit board FCB may be a flexible printed circuit board. The circuit board FCB may be electrically connected with the display panel DP. The circuit board FCB may include a plurality of drive elements. The plurality of drive elements may include circuits for driving the display panel DP and readout circuits ROC_M and ROC_S for driving the input sensor ISU.

The input sensor ISU may be electrically connected with the readout circuits ROC_M and ROC_S through the circuit board FCB. The input sensor ISU and the readout circuits ROC_M and ROC_S will be described below in detail.

The display device DD further includes an outer case BC that accommodates the display module DM. The outer case BC may be coupled with the window WM to define the exterior of the display device DD. The outer case BC protects components accommodated in the outer case BC, by absorbing shocks applied from the outside and preventing infiltration of foreign matter/moisture into the display module DM. Meanwhile, in an embodiment of the present disclosure, the outer case BC may be provided in a form in which a plurality of storage layers are combined together.

The display device DD according to an embodiment may further include an electronic module including various functional modules for operating the display module DM, a power supply module (e.g., a battery) that supplies power required for overall operation of the display device DD, and a bracket that is coupled with the display module DM and/or the outer case BC and that divides the inner space of the display device DD.

Figure 3:
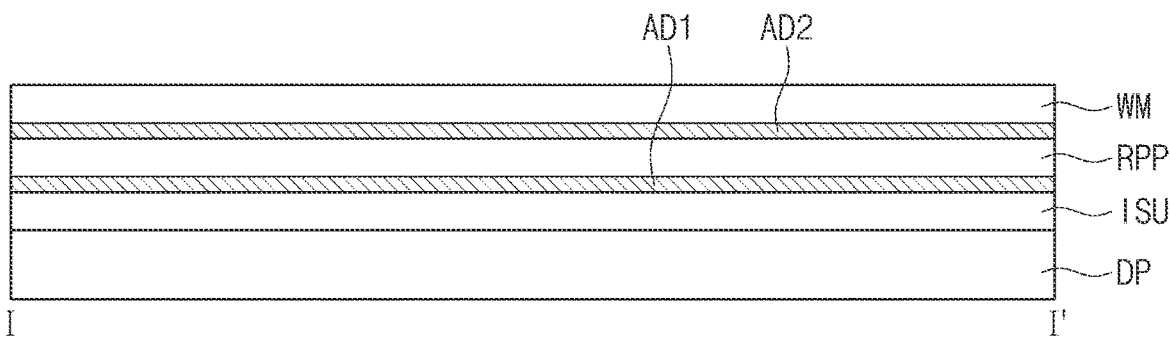
FIG. 3 is a sectional view taken along line I-I' illustrated in FIG. 2.
Figure 3:
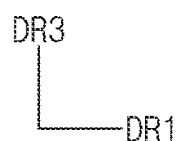

FIG. 3 is a sectional view taken along line I-I' illustrated in FIG. 2.

In FIG. 3, components of the display device DD are simply illustrated to describe a stacking relationship therebetween.

The display device DD according to an embodiment of the present disclosure may include the display panel DP, the input sensor ISU, the anti-reflector RPP, and the window WM. At least some of the display panel DP, the input sensor ISU, the anti-reflector RPP, and the window WM may be formed by a continuous process, or may be coupled together through an adhesive layer. For example, the input sensor ISU and the anti-reflector RPP may be coupled by an adhesive layer AD1. The anti-reflector RPP and the window WM may be coupled by an adhesive layer AD2.

The adhesive layers AD1 and AD2 may be transparent adhesive layers such as a pressure sensitive adhesive (PSA) film, an optically clear adhesive (OCA) film, or an optically clear resin (OCR). Adhesive layers to be described below may include a conventional adhesive or sticky substance. In an embodiment of the present disclosure, the anti-reflector RPP and the window WM may be replaced with other components, or may be omitted.

In FIG. 3, the input sensor ISU formed together with the display panel DP through a continuous process is directly disposed on the display panel DP. The expression "a component B is directly disposed on a component A" used herein means that a separate adhesive layer is not disposed between the component A and the component B. The component B is formed, through a continuous process, on a base surface provided by the component A after the component A is formed.

In this embodiment, the anti-reflector RPP and the window WM are of a "panel" type, and the input sensor ISU is of a "layer" type. The "panel" type may include a base layer (e.g., a synthetic resin film, a composite film, a glass substrate, or the like) that provides a base surface, whereas the "layer" type may not include the base layer. In other words, components of a "layer" type are disposed on base surfaces provided by other components. In an embodiment of the present disclosure, the anti-reflector RPP and the window WM may be of a "layer" type.

The display panel DP generates an image, and the input sensor ISU obtains coordinate information of an external input (e.g., a touch event). Although not separately illustrated, the display device DD according to an embodiment of the present disclosure may further include a protective layer or a protective panel disposed on the lower surface (or, the rear surface) of the display panel DP. The protective panel and the display panel DP may be coupled through an adhesive layer.

The display panel DP according to an embodiment of the present disclosure may be an emissive display panel, but the display panel DP is not particularly limited. For example, the display panel DP may be an organic light emitting display panel or a quantum-dot light emitting display panel. The panels are distinguished from each other depending on constituent materials of light emitting elements. An emissive layer of the organic light emitting display panel may contain an organic light emitting material. An emissive layer of the quantum-dot light emitting display panel may contain quantum dots and/or quantum rods. Hereinafter, it will be exemplified that the display panel DP is an organic light emitting display panel.

The anti-reflector RPP decreases the reflectivity of external light incident from above the window WM. The anti-reflector RPP according to an embodiment of the present disclosure may include a phase retarder and a polarizer. The phase retarder may be of a film type or a liquid-crystal coating type. The polarizer may also be of a film type or a liquid-crystal coating type. The film type may include a stretchable synthetic resin film, and the liquid-crystal coating type may include liquid crystals arranged in a predetermined arrangement. The phase retarder and the polarizer may further include a protective film. The phase retarder and the polarizer themselves or the protective film may be defined as a base layer of the anti-reflector RPP.

The anti-reflector RPP according to an embodiment of the present disclosure may include color filters. The color filters have a predetermined arrangement. The arrangement of the color filters may be determined in consideration of light emission colors of pixels included in the display panel DP. The anti-reflector RPP may further include a black matrix disposed adjacent to the color filters.

The anti-reflector RPP according to an embodiment of the present disclosure may include a destructive interference structure. For example, the destructive interference structure may include a first reflective layer and a second reflective layer that are disposed on different layers. First reflected light and second reflected light reflected by the first reflective layer and the second reflective layer, respectively, may destructively interfere with each other, and thus the reflectivity of external light may be decreased.

The window WM according to an embodiment of the present disclosure may include a glass substrate and/or a synthetic resin film. The window WM is not limited to a single layer. The window WM may include two or more films coupled by an adhesive layer. Although not separately illustrated, the window WM may further include a functional coating layer. The functional coating layer may include an anti-fingerprint layer, an anti-reflection layer, and a hard coating layer.

The input sensor ISU and the display panel DP will be described below in detail.

Figure 4:
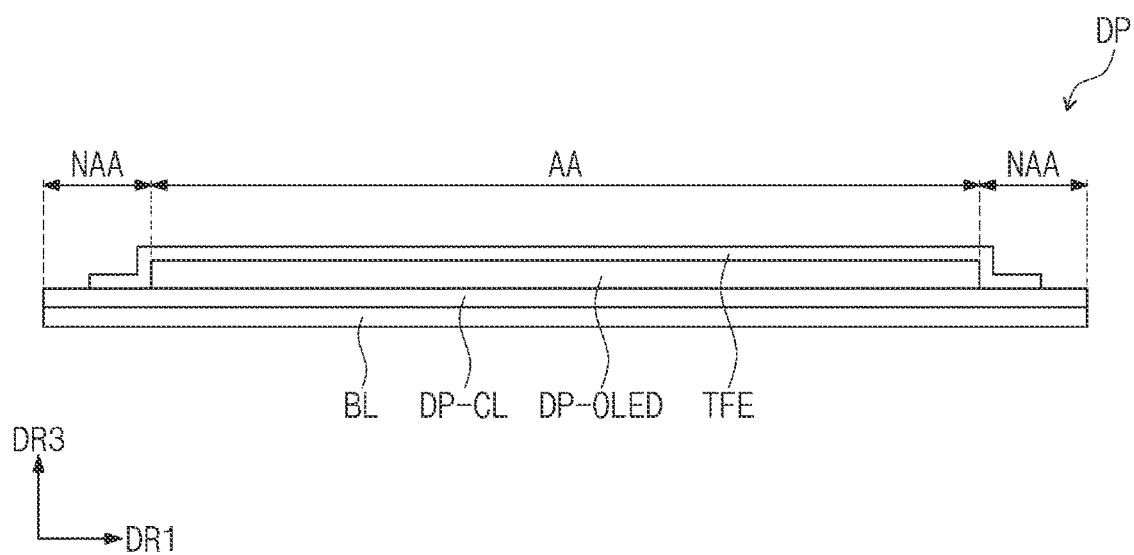
FIG. 4 is a sectional view of a display panel illustrated in FIG. 3.

FIG. 4 is a sectional view of the display panel DP illustrated in FIG. 3.

As illustrated in FIG. 4, the display panel DP includes a base layer BL, and a circuit element layer DP-CL, a light emitting element layer DP-OLED, and a thin-film encapsulation layer TFE that are disposed on the base layer BL. An active area AA and a peripheral area NAA that correspond to the display area DA and the non-display area NDA illustrated in FIG. 1 may be defined in the display panel DP. The expression "an area/portion corresponds to an area/portion" used herein means that "the areas/portions overlap each other", but is not limited to having the same area and/or the same shape.

The base layer BL may include at least one synthetic resin film. The base layer BL may include a glass substrate, a metal substrate, or an organic/inorganic composite substrate.

The circuit element layer DP-CL is disposed on the base layer BL. The circuit element layer DP-CL includes at least one insulating layer and circuit elements. The insulating layer includes at least one inorganic layer and at least one organic layer. The circuit elements may include signal lines and pixel drive circuits.

The light emitting element layer DP-OLED is disposed on the circuit element layer DP-CL. The light emitting element layer DP-OLED may include organic light emitting diodes. The light emitting element layer DP-OLED may further include an organic layer such as a pixel defining film.

The thin-film encapsulation layer TFE may be disposed on the light emitting element layer DP-OLED and may encapsulate the light emitting element layer DP-OLED. The thin-film encapsulation layer TFE may entirely cover the active area AA. The thin-film encapsulation layer TFE may cover a portion of the peripheral area NAA.

The thin-film encapsulation layer TFE includes a plurality of thin films. Some of the thin films are disposed to improve optical efficiency, and the other thin films are disposed to protect the organic light emitting diodes.

Figure 5:
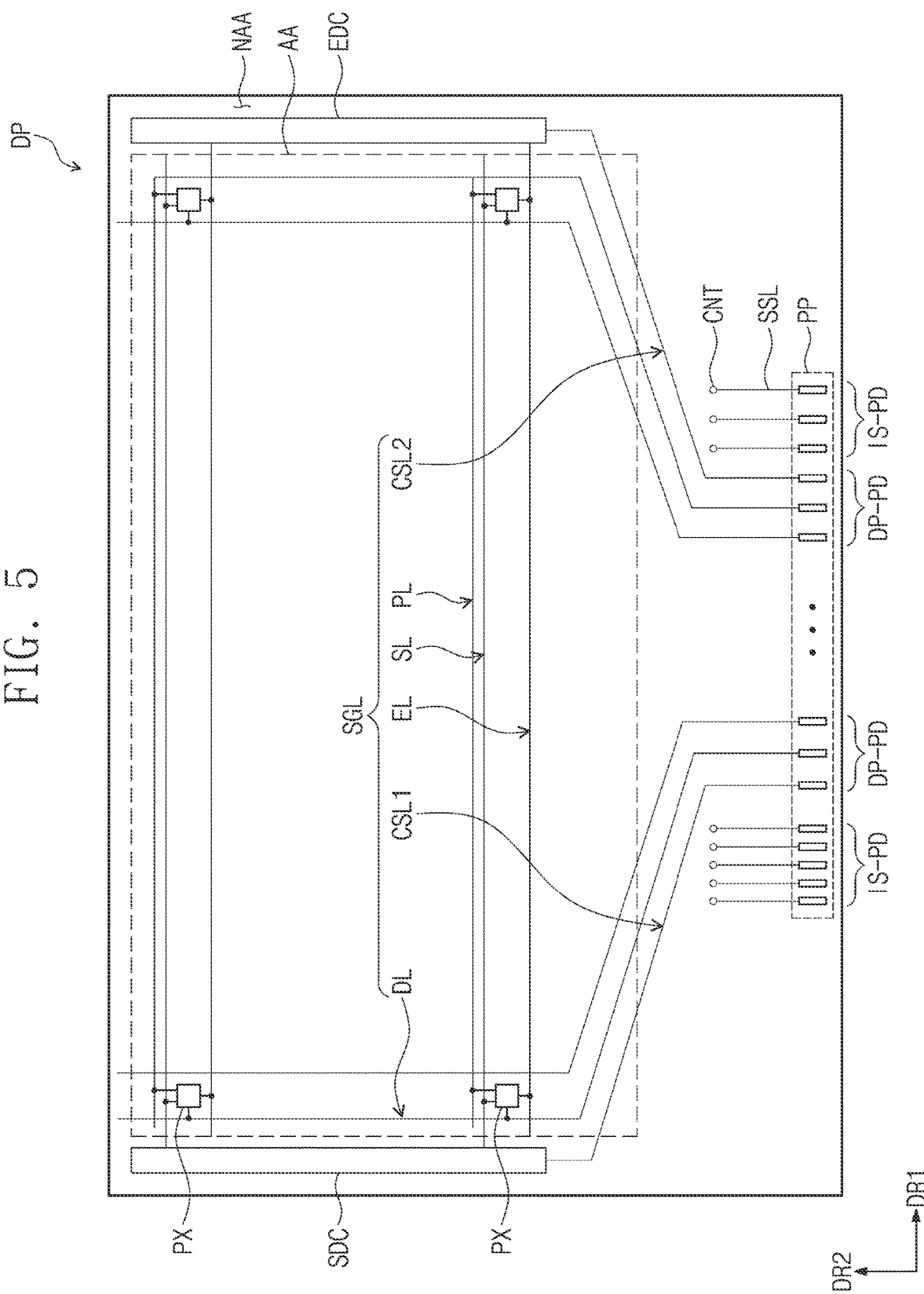
FIG. 5 is a plan view of the display panel according to an embodiment of the present disclosure.

FIG. 5 is a plan view of the display panel DP according to an embodiment of the present disclosure.

As illustrated in FIG. 5, the display panel DP may include a scan drive circuit SDC, a light emission drive circuit EDC, a plurality of signal lines SGL (hereinafter, referred to as the signal lines), a plurality of signal pads DP-PD and IS-PD (hereinafter, referred to as the signal pads), and a plurality of pixels PX (hereinafter, referred to as the pixels).

The scan drive circuit SDC generates a plurality of scan signals (hereinafter, referred to as the scan signals) and sequentially outputs the scan signals to a plurality of scan lines SL (hereinafter, referred to as the scan lines) to be described below.

The light emission drive circuit EDC generates a plurality of light emission control signals (hereinafter, referred to as the light emission control signals) and sequentially outputs the light emission control signals to a plurality of light emission control lines EL (hereinafter, referred to as the light emission control lines) to be described below.

The scan drive circuit SDC and the light emission drive circuit EDC may include a plurality of transistors formed through the same processes as processes that form transistors in the pixels PX.

The signal lines SGL include the scan lines SL, data lines DL, a power line PL, the light emission control lines EL, and control signal lines CSL1 and CSL2. Each of the scan lines SL, the data lines DL, and the light emission control lines EL is connected to a corresponding one of the pixels PX. The power line PL is commonly connected to the pixels PX. The control signal line CSL1 may provide control signals to the scan drive circuit SDC. The control signal line CSL2 may provide control signals to the light emission drive circuit EDC. The power line PL may provide a voltage required for operation of the pixels PX. The power line PL may include a plurality of lines that provide different voltages.

In this embodiment, the signal lines SGL may further include auxiliary lines SSL. In an embodiment of the present disclosure, the auxiliary lines SSL may be omitted. The auxiliary lines SSL are connected to contact holes CNT, respectively.

The auxiliary lines SSL may be electrically connected with signal lines of the input sensor ISU (refer to FIG. 6), which will be described below, through the contact holes CNT.

The display panel DP may include a pad area PP. The plurality of signal pads DP-PD and IS-PD may be disposed in the pad area PP of the display panel DP. The signal pads DP-PD and IS-PD may include the first type signal pads DP-PD connected to the data lines DL, the power line PL, and the control signal lines CSL1 and CSL2 and the second type signal pads IS-PD connected to the auxiliary lines SSL. The first type signal pads DP-PD and the second type signal pads IS-PD are disposed adjacent to each other in the pad area PP defined in a portion of the peripheral area NAA.

Stacking structures or constituent materials of the signal pads DP-PD and IS-PD may be formed through the same process without a distinction therebetween. The first type signal pads DP-PD and the second type signal pads IS-PD may be electrically connected with the circuit board FCB illustrated in FIG. 2.

The active area AA may be defined as an area where the pixels PX are disposed. A plurality of electronic elements are disposed in the active area AA. The electronic elements include organic light emitting diodes included in the respective pixels PX and pixel drive circuits connected to the organic light emitting diodes. The scan drive circuit SDC, the light emission drive circuit EDC, the signal lines SGL, the signal pads DP-PD and IS-PD, and the pixel drive circuits may be included in the circuit element layer DP-CL illustrated in FIG. 4.

Although not illustrated in the drawing, each of the pixels PX may include a plurality of transistors, a capacitor, and an organic light emitting diode. The pixels PX emit light in response to signals received through the scan lines SL, the data lines DL, the light emission control lines EL, and the power line PL.

In an embodiment, the display panel DP may further include a data drive circuit. In an embodiment, the data drive circuit may be disposed between the active area AA and the pad area PP. The data drive circuit may be electrically connected with the pixels PX through the data lines DL and may provide data signals to the pixels PX.

In an embodiment, the data drive circuit may be disposed on the circuit board FCB illustrated in FIG. 2.

Figure 6:
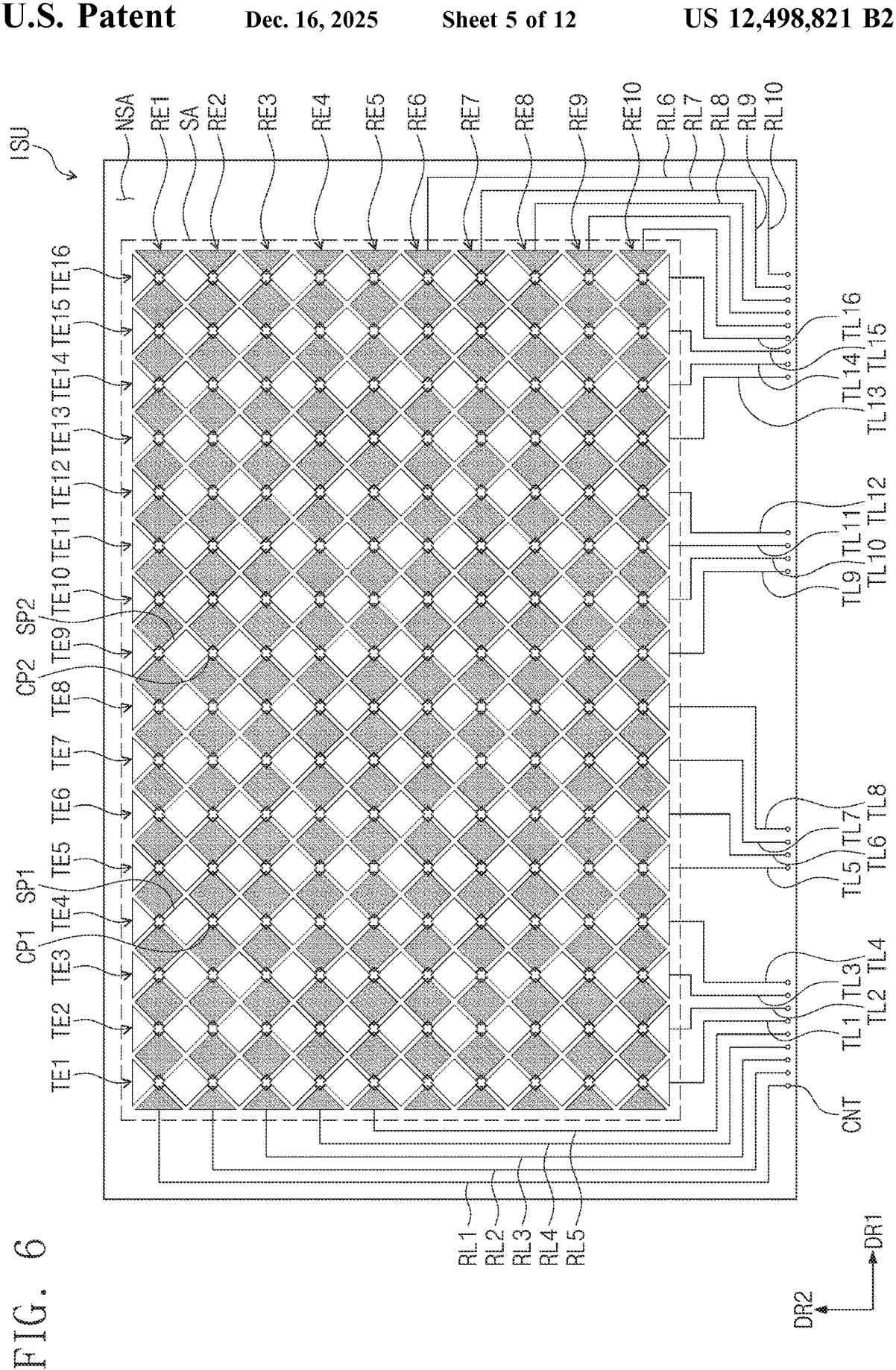
FIG. 6 is a plan view illustrating a configuration of an input sensor according to an embodiment of the present disclosure.

FIG. 6 is a plan view illustrating a configuration of the input sensor ISU according to an embodiment of the present disclosure.

Referring to FIG. 6, the input sensor ISU may include a sensing area SA and a non-sensing area NSA. The sensing area SA may be an area activated in response to an electrical signal. For example, the sensing area SA may be an area that senses an input. The non-sensing area NSA may surround the sensing area SA. The sensing area SA may correspond to the active area AA of FIG. 5, and the non-sensing area NSA may correspond to the peripheral area NAA of FIG. 5.

The input sensor ISU includes sensing electrodes. The sensing electrodes include first to sixteenth transmitting electrodes TE1 to TE16 and first to tenth receiving electrodes RE1 to RE10. The first to sixteenth transmitting electrodes TE1 to TE16 and the first to tenth receiving electrodes RE1 to RE10 are disposed in the sensing area SA. The first to sixteenth transmitting electrodes TE1 to TE16 and the first to tenth receiving electrodes RE1 to RE10 are electrically insulated from each other and cross each other in the sensing area SA. In an embodiment of the present disclosure, the input sensor ISU includes the first to sixteenth transmitting electrodes TE1 to TE16 and the first to tenth receiving electrodes RE1 to RE10. However, the present disclosure is not limited thereto. The number of transmitting electrodes and the number of receiving electrodes may be diversely changed. FIG. 6 illustrates one example that the number of transmitting electrodes is larger than the number of receiving electrodes. However, in an embodiment, the number of receiving electrodes may be larger than or equal to the number of transmitting electrodes.

In this specification, to clearly distinguish between the electrodes TE1 to TE16 and the electrodes RE1 to RE10, the electrodes TE1 to TE16 are referred to as the transmitting electrodes, and the electrodes RE1 to RE10 are referred to as the receiving electrodes. However, functions of the electrodes TE1 to TE16 and the electrodes RE1 to RE10 are not limited to the names. Depending on operating modes, the transmitting electrodes TE1 to TE16 may operate as receiving electrodes as well as transmitting electrodes, and the receiving electrodes RE1 to RE10 may operate as transmitting electrodes as well as receiving electrodes.

Each of the first to sixteenth transmitting electrodes TE1 to TE16 extends in the second direction DR2. The first to sixteenth transmitting electrodes TE1 to TE16 may be arranged to be spaced apart from each other in the first direction DR1. The first to sixteenth transmitting electrodes TE1 to TE16 may be electrically separated from each other. Each of the first to sixteenth transmitting electrodes TE1 to TE16 includes first sensing patterns SP1 spaced apart from each other in the second direction DR2 and first connecting patterns CP1 electrically connecting the first sensing patterns SP1. The first sensing patterns SP1 and the first connecting patterns CP1 are disposed on different layers and do not have an integral shape.

Each of the first to tenth receiving electrodes RE1 to RE10 extends in the first direction DR1. The first to tenth receiving electrodes RE1 to RE10 may be arranged to be spaced apart from each other in the second direction DR2. The first to tenth receiving electrodes RE1 to RE10 may be electrically separated from each other. The first to tenth receiving electrodes RE1 to RE10 may be disposed to cross the first to sixteenth transmitting electrodes TE1 to TE16 and may be electrically insulated from the first to sixteenth transmitting electrodes TE1 to TE16. Each of the first to tenth receiving electrodes RE1 to RE10 includes second sensing patterns SP2 spaced apart from each other in the first direction DR1 and second connecting patterns CP2 electrically connecting the second sensing patterns SP2. The second sensing patterns SP2 and the second connecting patterns CP2 may have an integral shape.

In FIG. 6, the first sensing patterns SP1 and the second sensing patterns SP2 are illustrated as having a rhombic shape. However, the present disclosure is not limited thereto. The first sensing patterns SP1 and the second sensing patterns SP2 may have various polygonal shapes.

The first to sixteenth transmitting electrodes TE1 to TE16 and the first to tenth receiving electrodes RE1 to RE10 may each have a mesh shape. As each of the first to sixteenth transmitting electrodes TE1 to TE16 and the first to tenth receiving electrodes RE1 to RE10 has a mesh shape, parasitic capacitance between electrodes (e.g., a second electrode CE (refer to FIG. 7)) of the display panel DP (refer to FIG. 5) may be decreased.

The input sensor ISU may obtain position information for an external input through a change in mutual capacitance between the first to sixteenth transmitting electrodes TE1 to TE16 and the first to tenth receiving electrodes RE1 to RE10.

The input sensor ISU may further include first to sixteenth transmitting lines TL1 to TL16 and first to tenth receiving lines RL1 to RL10. The first to sixteenth transmitting lines TL1 to TL16 and the first to tenth receiving lines RL1 to RL10 may be disposed in the non-sensing area NSA. Each of the first to sixteenth transmitting lines TL1 to TL16 may be electrically connected to one side of a corresponding one of the first to sixteenth transmitting electrodes TE1 to TE16. Each of the first to fifth receiving lines RL1 to RL5 may be electrically connected to one side of a corresponding one of the first to fifth receiving electrodes RE1 to RE5, and each of the sixth to tenth receiving lines RL6 to RL10 may be electrically connected to an opposite side of a corresponding one of the sixth to tenth receiving electrodes RE6 to RE10. However, the present disclosure is not limited thereto.

The input sensor ISU is electrically connected with the readout circuits ROC_M and ROC_S (refer to FIG. 2) through the first to sixteenth transmitting lines TL1 to TL16 and the first to tenth receiving lines RL1 to RL10. The readout circuits ROC_M and ROC_S may control operation of the input sensor ISU.

The readout circuits ROC_M and ROC_S may transmit transmission signals to the first to sixteenth transmitting lines TL1 to TL16 and/or the first to tenth receiving lines RL1 to RL10 and may receive reception signals from the first to sixteenth transmitting lines TL1 to TL16 and/or the first to tenth receiving lines RL1 to RL10.

In an embodiment, the first to sixteenth transmitting lines TL1 to TL16 and the first to tenth receiving lines RL1 to RL10 of the input sensor ISU may be electrically connected to the auxiliary lines SSL of the display panel DP through the contact holes CNT and may be electrically connected to the readout circuits ROC_M and ROC_S of FIG. 2 through the second type signal pads IS-PD. However, the present disclosure is not limited thereto.

In an embodiment, the input sensor ISU of the display device DD may include pads electrically connected with the first to sixteenth transmitting lines TL1 to TL16 and the first to tenth receiving lines RL1 to RL10. In this case, the circuit board FCB including the readout circuits ROC_M and ROC_S may be directly connected to the pads of the input sensor ISU without passing through the display panel DP.

Figure 7:
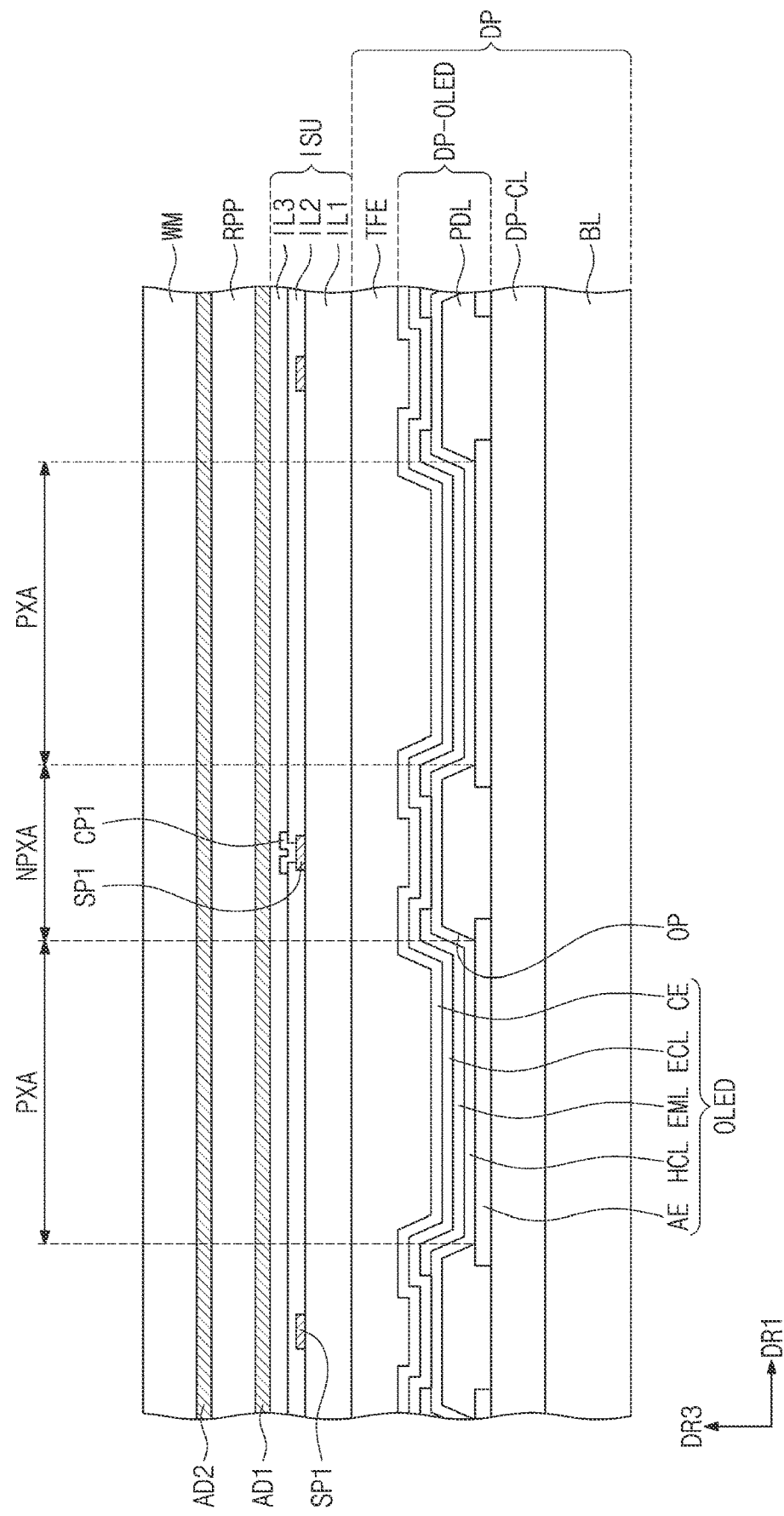
FIG. 7 is a sectional view of the display device according to an embodiment of the present disclosure.

FIG. 7 is a sectional view of the display device according to an embodiment of the present disclosure.

As illustrated in FIG. 7, the display panel DP includes the base layer BL, and the circuit element layer DP-CL, the light emitting element layer DP-OLED, and the thin-film encapsulation layer TFE that are disposed on the base layer BL. Although not separately illustrated, the display panel DP may further include functional layers such as an anti-reflection layer, a reflective index control layer, and the like.

The base layer BL may include a synthetic resin film. A synthetic resin layer is formed on a working substrate used in the manufacture of the display panel DP. Thereafter, a conductive layer and an insulating layer are formed on the synthetic resin layer. When the working substrate is removed, the synthetic resin layer corresponds to the base layer BL. The synthetic resin layer may be a polyimide-based resin layer, and the material thereof is not particularly limited. In addition, the base layer BL may include a glass substrate, a metal substrate, or an organic/inorganic composite substrate.

The circuit element layer DP-CL includes at least one insulating layer and a circuit element. Hereinafter, the insulating layer included in the circuit element layer DP-CL is referred to as the intermediate insulating layer. The intermediate insulating layer includes at least one intermediate inorganic film and at least one intermediate organic film. The circuit element includes a signal line and a pixel drive circuit. The circuit element layer DP-CL may be formed through a process of forming an insulating layer, a semiconductor layer, and a conductive layer by coating, deposition, or the like and a process of making the insulating layer, the semiconductor layer, and the conductive layer subject to patterning by a photolithography process.

The light emitting element layer DP-OLED may include a pixel defining film PDL and an organic light emitting diode OLED. The pixel defining film PDL may contain an organic material. A first electrode AE is disposed on the circuit element layer DP-CL. The pixel defining film PDL is formed on the first electrode AE. An opening OP is defined in the pixel defining film PDL. The opening OP of the pixel defining film PDL exposes at least a portion of the first electrodes AE. In an embodiment of the present disclosure, the pixel defining film PDL may be omitted.

A hole control layer HCL may be disposed on the first electrode AE. An emissive layer EML is disposed on the hole control layer HCL. The emissive layer EML may be disposed in an area corresponding to the opening OP. That is, the emissive layer EML may be separately formed for each of the pixels PX (refer to FIG. 5). The emissive layer EML may contain an organic material and/or an inorganic material. The emissive layer EML may generate predetermined colored light.

An electron control layer ECL is disposed on the emissive layer EML. The second electrode CE is disposed on the electron control layer ECL. The second electrode CE is commonly disposed for the pixels PX.

The thin-film encapsulation layer TFE is disposed on the second electrode CE. The thin-film encapsulation layer TFE seals the light emitting element layer DP-OLED. The thin-film encapsulation layer TFE includes at least one insulating layer. The thin-film encapsulation layer TFE according to an embodiment of the present disclosure may include at least one inorganic film (hereinafter, referred to as the inorganic encapsulation film). The thin-film encapsulation layer TFE according to an embodiment of the present disclosure may include at least one organic film (hereinafter, referred to as the organic encapsulation film) and at least one inorganic encapsulation film.

The inorganic encapsulation film protects the light emitting element layer DP-OLED from moisture/oxygen, and the organic encapsulation film protects the light emitting element layer DP-OLED from foreign matter such as dust particles. The inorganic encapsulation film may include, but is not particularly limited to, a silicon nitride layer, a silicon oxy-nitride layer, a silicon oxide layer, a titanium oxide layer, or an aluminum oxide layer. The organic encapsulation film may include, but is not particularly limited to, an acrylate-based organic film.

The input sensor ISU includes a base layer IL1, and first and second conductive layers and first and second insulating layers IL2 and IL3 that are disposed on the base layer IL1. The base layer IL1 may contain an inorganic material. For example, the base layer IL1 may include a silicon nitride layer. The inorganic film disposed at the top of the thin-film encapsulation layer TFE may also include a silicon nitride layer, and the silicon nitride layer of the thin-film encapsulation layer TFE and the base layer IL1 may be formed in different deposition conditions.

The first conductive layer is disposed on the base layer IL1. The first conductive layer may include the first sensing patterns SP1, the second sensing patterns SP2, and the second connecting patterns CP2. The second conductive layer is disposed on the first conductive layer. The second conductive layer may include the first connecting patterns CP1. The first insulating layer IL2 is disposed between the first conductive layer and the second conductive layer. The first insulating layer IL2 spaces and separates the first conductive layer and the second conductive layer in a cross-sectional view. The first insulating layer IL2 may have contact holes for partially exposing the first sensing patterns SP1, and the first connecting patterns CP1 may be connected with the first sensing patterns SP1 through the contact holes. The second insulating layer IL3 is disposed on the first insulating layer IL2. The second insulating layer IL3 may cover the second conductive layer. The second insulating layer IL3 protects the second conductive layer from an external environment.

Mesh lines of the first sensing patterns SP1 and the second sensing patterns SP2 may define a plurality of mesh holes. The mesh lines may have a three-layer structure of titanium/aluminum/titanium.

In the display device DD according to an embodiment of the present disclosure, the input sensor ISU may be directly disposed on the display panel DP. This means that an adhesive film is not disposed between the input sensor ISU and the display panel DP. That is, the input sensor ISU may be directly formed on the display panel DP through a continuous process. In this case, the input sensor ISU may be expressed as an input sensing layer.

The portion where the first electrode AE and the emissive layer EML are disposed may be called the pixel area PXA. The pixel areas PXA may be disposed to be spaced apart from each other in the first direction DR1 and the second direction DR2 (refer to FIG. 5). A non-pixel area NPXA may be disposed between the pixel areas PXA and may surround the pixel areas PXA.

The anti-reflector RPP may be disposed on the upper surface of the input sensor ISU. In an embodiment of the present disclosure, the anti-reflector RPP may include a polarizer film. The anti-reflector RPP may further include a protective film and other functional films in addition to the polarizer film. However, for convenience of description, only the polarizer film is illustrated. The adhesive layer AD1 may be disposed between the anti-reflector RPP and the input sensor ISU. Accordingly, the anti-reflector RPP may be coupled with the input sensor ISU by the adhesive layer AD1. The window WM may be coupled to the top of the anti-reflector RPP through the adhesive layer AD2.

Referring again to FIG. 6, the input sensor ISU may be a capacitive touch sensor. For example, one of the first to sixteenth transmitting electrodes TE1 to TE16 and the first to tenth receiving electrodes RE1 to RE10 receives a transmission signal, and another one of the first to sixteenth transmitting electrodes TE1 to TE16 and the first to tenth receiving electrodes RE1 to RE10 outputs a change in capacitance formed between the first to sixteenth transmitting electrodes TE1 to TE16 and the first to tenth receiving electrodes RE1 to RE10 as a sensing signal. For example, when the first transmitting electrode TE1 receives a transmission signal (or, a drive signal), the first transmitting electrode TE1 is capacitively coupled to the first to tenth receiving electrodes RE1 to RE10. When a part of the user's body is located on a specific receiving electrode (e.g., the first receiving electrode RE1) among the capacitively coupled first to tenth receiving electrodes RE1 to RE10, the capacitance between the first transmitting electrode TE1 and the first receiving electrode RE1 is changed. The readout circuits ROC_M and ROC_S (refer to FIG. 2) may calculate coordinate information of the user's touch by detecting changed capacitance of a sensing signal received from the first receiving line RL1 connected with the first receiving electrode RE1.

Figure 8:
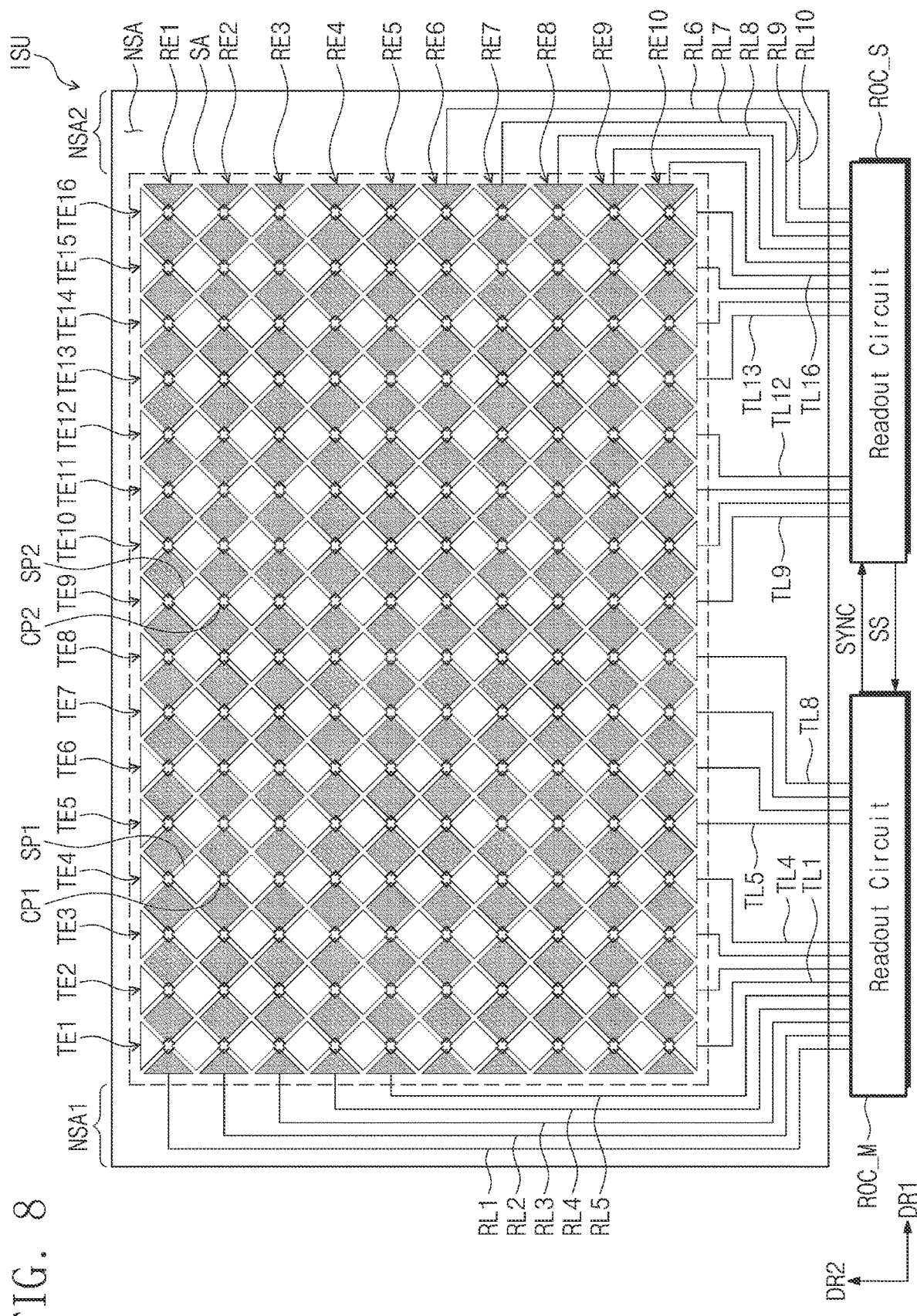
FIG. 8 is a view illustrating a connection relationship between the input sensor and readout circuits according to an embodiment of the present disclosure.

FIG. 8 is a view illustrating a connection relationship between the input sensor ISU and the readout circuits ROC_M and ROC_S according to an embodiment of the present disclosure.

Referring to FIG. 8, in an embodiment, the readout circuit ROC_M may operate as a master, and the readout circuit ROC_S may operate as a slave. In an embodiment, the readout circuit ROC_M may operate as a slave, and the readout circuit ROC_S may operate as a master. In the following description, the readout circuit ROC_M and the readout circuit ROC_S are called the master readout circuit and the slave readout circuit, respectively.

Some of the transmitting electrodes among the first to sixteenth transmitting electrodes TE1 to TE16 and some of the receiving electrodes among the first to tenth receiving electrodes RE1 to RE10 are electrically connected to the master readout circuit ROC_M. In an embodiment, the first to eighth transmitting lines TL1 to TL8 and the first to fifth receiving lines RL1 to RL5 are electrically connected to the master readout circuit ROC_M. The other transmitting electrodes among the first to sixteenth transmitting electrodes TE1 to TE16 and the other receiving electrodes among the first to tenth receiving electrodes RE1 to RE10 are electrically connected to the slave readout circuit ROC_S. In an embodiment, the ninth to sixteenth transmitting lines TL9 to TL16 and the sixth to tenth receiving lines RL6 to RL10 are electrically connected to the slave readout circuit ROC_S.

Each of the first to fifth receiving lines RL1 to RL5 may extend from one side of a corresponding one of the first to fifth receiving electrodes RE1 to RE5 and may be disposed in a first non-sensing area NSA1 of the non-sensing area NSA. Each of the sixth to tenth receiving lines RL6 to RL10 may extend from an opposite side of a corresponding one of the sixth to tenth receiving electrodes RE6 to RE10 and may be disposed in a second non-sensing area NSA2 of the non-sensing area NSA. The second non-sensing area NSA2 may be spaced apart from the first sensing area NSA1 with the sensing area SA therebetween.

Referring again to FIG. 1, efforts for minimizing the non-display area NDA are being constantly made for the aesthetic sense of the display device DD. In general, the non-sensing area NSA corresponds to the non-display area NDA. When all the first to tenth receiving lines RL1 to RL10 are disposed on one of the first non-sensing area NSA1 and the second non-sensing area NSA2, the width and spacing of the first to tenth receiving lines RL1 to RL10 and/or the first to sixteenth transmitting lines TL1 to TL16 have to be decreased. In this case, the qualities of reception signals and/or transmission signals may be degraded due to an increase in the resistances of the first to tenth receiving lines RL1 to RL10 and/or the first to sixteenth transmitting lines TL1 to TL16.

Furthermore, the areas of the first non-sensing area NSA1 and the second non-sensing area NSA2 are limited, and therefore there is a limitation in increasing the number of first to tenth receiving lines RL1 to RL10 and/or the number of first to sixteenth transmitting lines TL1 to TL16.

In an embodiment, the first to tenth receiving lines RL1 to RL10 may be distributed in the first non-sensing area NSA1 and the second non-sensing area NSA1, and thus the width and spacing of the first to tenth receiving lines RL1 to RL10 may be sufficiently secured.

FIG. 8 illustrates one example that the first to eighth transmitting lines TL1 to TL8 and the first to fifth receiving lines RL1 to RL5 are electrically connected to the master readout circuit ROC_M and the ninth to sixteenth transmitting lines TL9 to TL16 and the sixth to tenth receiving lines RL6 to RL10 are electrically connected to the slave readout circuit ROC_S. However, the present disclosure is not limited thereto.

In an embodiment, the first to eighth transmitting lines TL1 to TL8 and the first to fifth receiving lines RL1 to RL5 may be electrically connected to the slave readout circuit ROC_S, and the ninth to sixteenth transmitting lines TL9 to TL16 and the sixth to tenth receiving lines RL6 to RL10 may be electrically connected to the master readout circuit ROC_M. In this case, the first to fifth receiving lines RL1 to RL5 may be disposed in the second non-sensing area NSA2, and the sixth to tenth receiving lines RL6 to RL10 may be disposed in the first non-sensing area NSA1.

Furthermore, although FIG. 8 illustrates one example that eight transmitting lines and five receiving lines are connected to each of the master readout circuit ROC_M and the slave readout circuit ROC_S, the present disclosure is not limited thereto. The numbers of transmitting lines and receiving lines connected to each of the master readout circuit ROC_M and the slave readout circuit ROC_S may be diversely changed.

In an embodiment, the master readout circuit ROC_M may provide a synchronization signal SYNC to the slave readout circuit ROC_S. In an embodiment, the slave readout circuit ROC_S may provide a sensing signal SS to the master readout circuit ROC_M.

Figure 9:
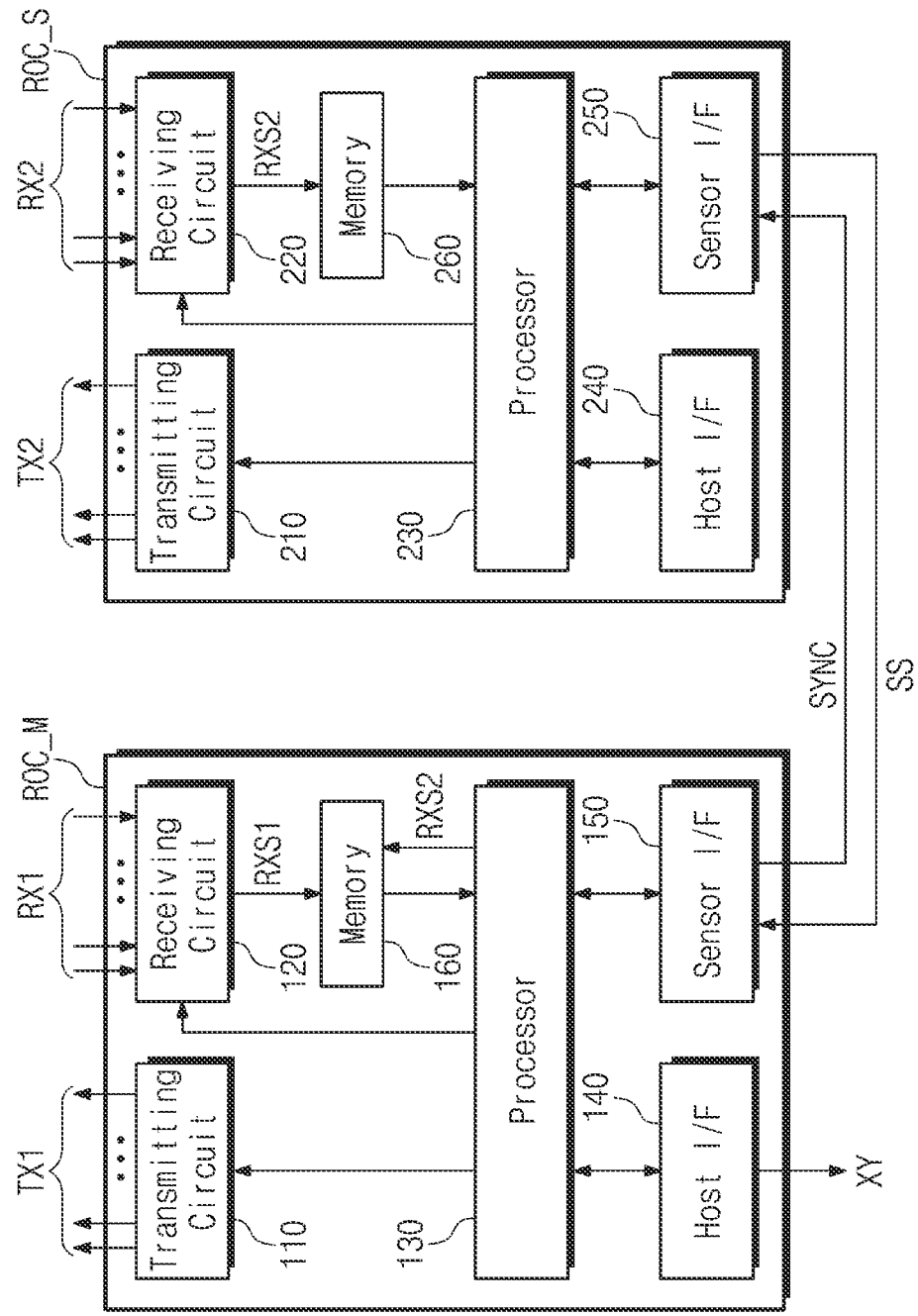
FIG. 9 is a block diagram illustrating circuit configurations of a master readout circuit and a slave readout circuit according to an embodiment of the present disclosure.

FIG. 9 is a block diagram illustrating circuit configurations of the master readout circuit ROC_M and the slave readout circuit ROC_S according to an embodiment of the present disclosure.

Referring to FIG. 9, the master readout circuit ROC_M includes a transmitting circuit 110, a receiving circuit 120, a processor 130, a host interface 140, a sensor interface 150, and a memory 160.

The processor 130 may control operations of the transmitting circuit 110, the receiving circuit 120, the host interface 140, the sensor interface 150, and the memory 160. The processor 130 generates a signal to be transmitted to the first to eighth transmitting lines TL1 to TL8 of the input sensor ISU (refer to FIG. 8) and converts a signal received from the input sensor ISU into a sensing signal.

The transmitting circuit 110 converts a signal provided from the processor 130 into a first transmission signal TX1 and provides the first transmission signal TX1 to the input sensor ISU. The first transmission signal TX1 may be provided to the first to eighth transmitting lines TL1 to TL8 illustrated in FIG. 8.

The receiving circuit 120 receives a first input signal RX1 from the input sensor ISU and stores the first input signal RX1 in the memory 160. The first input signal RX1 may be received from the first to fifth receiving lines RL1 to RL5 illustrated in FIG. 8.

The host interface 140 in the master readout circuit ROC_M may communicate with a host processor (not illustrated). The host interface 140 may receive a synchronization signal from the host processor and may provide the synchronization signal to the processor 130. The host interface 140 receives the sensing signal from the processor 130 and outputs touch position information XY corresponding to the sensing signal. The touch position information XY may be provided to the host processor. The touch position information XY may include information representing the position of a touch on the input sensor ISU. In an embodiment, the touch position information XY may include not only coordinate information representing the position of the touch but also biometric information such as the user's fingerprint.

The sensor interface 150 in the master readout circuit ROC_M may communicate with a sensor interface 250 in the slave readout circuit ROC_S. The sensor interface 150 transmits a synchronization signal SYNC to the sensor interface 250 in the slave readout circuit ROC_S and receives a sensing signal SS from the sensor interface 250 in the slave readout circuit ROC_S. The sensor interface 150 provides the sensing signal SS to the processor 130. Based on the sensing signal from the input sensor ISU and the sensing signal SS from the sensor interface 150, the processor 130 may provide the information representing the position of the touch on the input sensor ISU to the host processor through the host interface 140. That is, the sensing signal provided from the host interface 140 to the host processor may be information representing the position of the touch on the entire area of the input sensor ISU.

The slave readout circuit ROC_S includes a transmitting circuit 210, a receiving circuit 220, a processor 230, a host interface 240, the sensor interface 250, and a memory 260.

The transmitting circuit 210, the receiving circuit 220, and the processor 230 in the slave readout circuit ROC_S may operate similarly to the transmitting circuit 110, the receiving circuit 120, and the processor 130 in the master readout circuit ROC_M.

The transmitting circuit 210 in the slave readout circuit ROC_S generates a signal to be transmitted to the ninth to sixteenth transmitting lines TL9 to TL16 of the input sensor ISU (refer to FIG. 8) and converts a signal received from the input sensor ISU into a sensing signal.

The host interface 240 in the slave readout circuit ROC_S may not perform substantially any operation. Thus, the host interface 240 in the slave readout circuit ROC_S may be omitted.

The receiving circuit 220 in the slave readout circuit ROC_S receives a second input signal RX2 from the input sensor ISU and stores the second input signal RX2 in the memory 260. The second input signal RX2 may be received from the sixth to tenth receiving lines RL6 to RL10 illustrated in FIG. 8.

The sensor interface 250 in the slave readout circuit ROC_S may communicate with the sensor interface 150 in the master readout circuit ROC_M. The sensor interface 250 receives the synchronization signal SYNC from the sensor interface 150 and provides the sensing signal SS to the sensor interface 150.

The processor 230 may provide a transmission signal to the transmitting circuit 210 in response to the synchronization signal SYNC received from the sensor interface 250. The processor 230 may provide the sensing signal SS received from the receiving circuit 220 to the sensor interface 150 in the master readout circuit ROC_M through the sensor interface 250 in the slave readout circuit ROC_S.

The master readout circuit ROC_M and the slave readout circuit ROC_S may each further include a clock generator for generating a clock signal and a voltage generator for generating a drive voltage.

Figure 10:
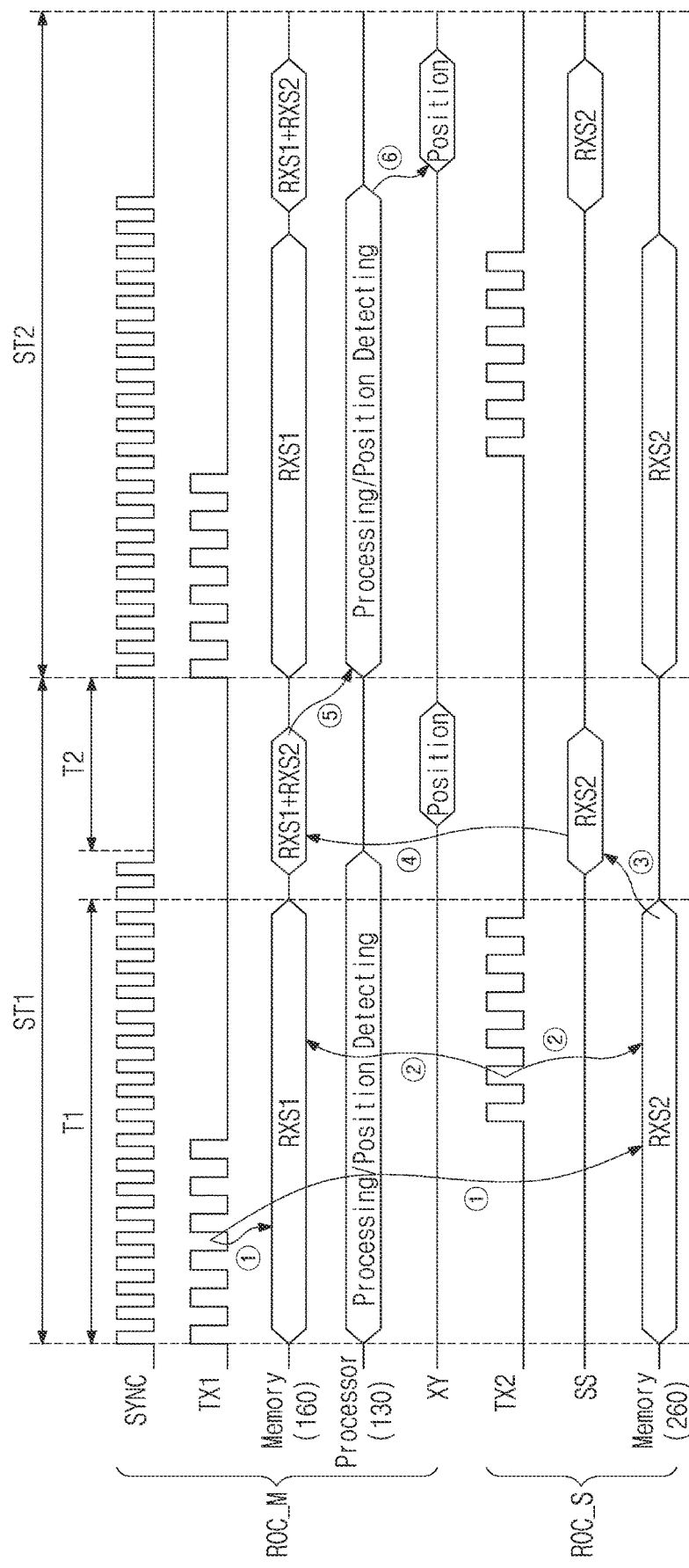
FIG. 10 is a timing chart for describing operations of the master readout circuit and the slave readout circuit illustrated in FIG. 9.

FIG. 10 is a timing chart for describing operations of the master readout circuit ROC_M and the slave readout circuit ROC_S illustrated in FIG. 9.

Referring to FIGS. 9 and 10, in each of touch report intervals ST1 and ST2, the master readout circuit ROC_M and the slave readout circuit ROC_S may sense an external input and may output position information corresponding to the sensed input.

The touch report interval ST1 includes a detection interval T1 and a communication interval T2. During the detection interval T1, the master readout circuit ROC_M and the slave readout circuit ROC_S may transmit first and second transmission signals TX1 and TX2 to the input sensor ISU and may receive first and second input signals RX1 and RX2 from the input sensor ISU. During the communication interval T2, the slave readout circuit ROC_S transmits a sensing signal SS to the master readout circuit ROC_M.

The master readout circuit ROC_M transmits a synchronization signal SYNC to the slave readout circuit ROC_S. The first transmission signal TX1 of the master readout circuit ROC_M and the second transmission signal TX2 of the slave readout circuit ROC_S may be transmitted to the input sensor ISU in synchronization with the synchronization signal SYNC.

The operating sequence of the master readout circuit ROC_M and the slave readout circuit ROC_S is as follows.

Step ①: The master readout circuit ROC_M stores a first reception signal RXS1 corresponding to the input signals RX1 in the memory 160 when the input signals RX1 are received after the transmission of the first transmission signal TX1. The first input signals RX1 are signals received from the first to fifth receiving lines RL1 to RL5 for the first transmission signal TX1. At the same time, the slave readout circuit ROC_S stores a second reception signal RXS2 corresponding to the second input signals RX2 in the memory 260 when the second input signals RX2 for the first transmission signal TX1 are received. The second input signals RX2 are signals received from the sixth to tenth receiving lines RL6 to RL10 for the first transmission signal TX1.

Step ②: The slave readout circuit ROC_S stores the second reception signal RXS2 corresponding to the second input signals RX2 in the memory 260 when the second input signals RX2 are received after the transmission of the second transmission signal TX2. The second input signals RX2 are signals received from the sixth to tenth receiving lines RL6 to RL10 for the second transmission signal TX2. At the same time, the master readout circuit ROC_M stores the first reception signal RXS1 corresponding to the first input signals RX1 in the memory 260 when the first input signals RX1 for the second transmission signal TX2 are received. The first input signals RX1 are signals received from the first to fifth receiving lines RL1 to RL5 for the second transmission signal TX2.

Step ③: The slave readout circuit ROC_S transmits the second reception signal RXS2 stored in the memory 260 to the master readout circuit ROC_M as the sensing signal SS. The sensing signal SS may include both the second reception signal RXS2 for the first transmission signal TX1 and the second reception signal RXS2 for the second transmission signal TX2. That is, the sensing signal SS may include both the second input signals RX2 for the first transmission signal TX1 and the second input signals RXS2 for the second transmission signal TX2.

Step ④: The master readout circuit ROC_M stores the received second reception signal RXS2 in the memory 160. The first reception signal RXS1 and the second reception signal RXS2 for the first transmission signal TX1 and the second transmission signal TX2 may be stored in the memory 160.

Step ⑤: The processor 130 in the master readout circuit ROC_M calculates the position of a touch based on the first reception signal RXS1 and the second reception signal RXS2 stored in the memory 160.

Step ⑥: The host interface 140 in the master readout circuit ROC_M may receive the sensing signal from the processor 130 and may provide touch position information XY corresponding to the sensing signal to the host processor.

Figure 11:
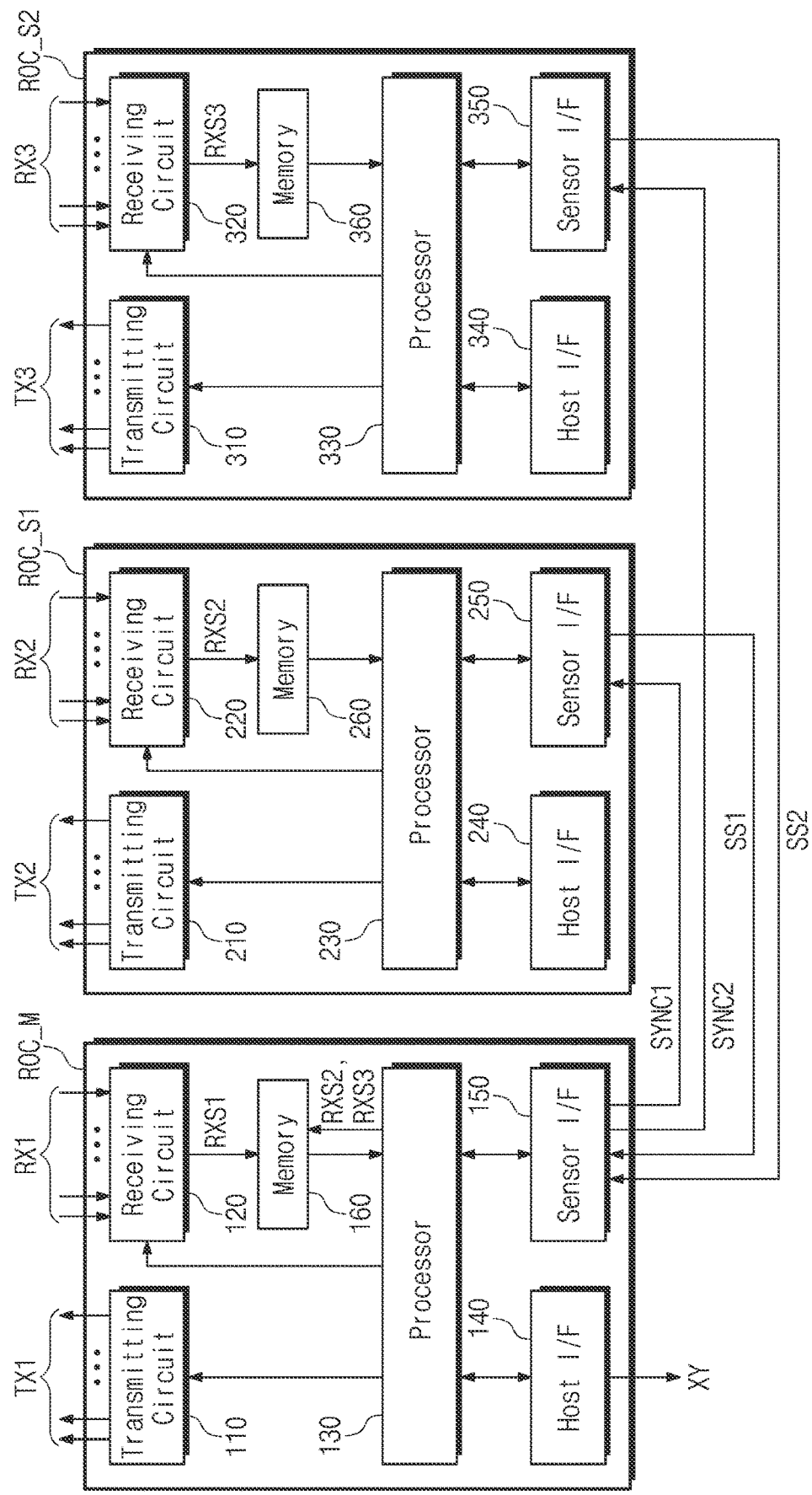
FIG. 11 is a block diagram illustrating circuit configurations of a master readout circuit and slave readout circuits according to an embodiment of the present disclosure.

FIG. 11 is a block diagram illustrating circuit configurations of a master readout circuit ROC_M and slave readout circuits ROC_S1 and ROC_S2 according to an embodiment of the present disclosure.

The master readout circuit ROC_M illustrated in FIG. 11 has substantially the same circuit configuration as the master readout circuit ROC_M illustrated in FIG. 9 and operates similarly to the master readout circuit ROC_M illustrated in FIG. 9, and therefore repetitive description will be omitted.

The slave readout circuits ROC_S1 and ROC_S2 illustrated in FIG. 11 have substantially the same circuit configuration as the slave readout circuit ROC_S illustrated in FIG. 9 and operates similarly to the slave readout circuit ROC_S illustrated in FIG. 9, and therefore repetitive description will be omitted.

Referring to FIGS. 6 and 11, the first to sixteenth transmitting lines TL1 to TL16 and the first to tenth receiving lines RL1 to RL10 may be electrically connected with the master readout circuit ROC_M and the slave readout circuits ROC_S1 and ROC_S2.

In an embodiment, the master readout circuit ROC_M may be electrically connected with the first to fifth transmitting lines TL1 to TL5 and the first to third receiving lines RL1 to RL3. The slave readout circuit ROC_S1 may be electrically connected with the sixth to tenth transmitting lines TL6 to TL10 and the fourth to sixth receiving lines RL4 to RL6. The slave readout circuit ROC_S2 may be electrically connected with the eleventh to sixteenth transmitting lines TL11 to TL16 and the seventh to tenth receiving lines RL7 to RL10.

The master readout circuit ROC_M includes a transmitting circuit 110, a receiving circuit 120, a processor 130, a host interface 140, a sensor interface 150, and a memory 160.

The sensor interface 150 in the master readout circuit ROC_M may communicate with a sensor interface 250 in the slave readout circuit ROC_S1 and a sensor interface 350 in the slave readout circuit ROC_S2. The sensor interface 150 transmits a first synchronization signal SYNC1 to the sensor interface 250 and receives a first sensing signal SS1 from the sensor interface 250. The sensor interface 150 transmits a second synchronization signal SYNC2 to the sensor interface 350 and receives a second sensing signal SS2 from the sensor interface 250. The sensor interface 150 provides the first sensing signal SS1 and the second sensing signal SS2 to the processor 130. Based on a sensing signal from the input sensor ISU, the first sensing signal SS1 from the sensor interface 250, and the second sensing signal SS2 from the sensor interface 350, the processor 130 may provide information representing the position of a touch on the input sensor ISU to a host processor through the host interface 140. That is, the sensing signal provided from the host interface 140 to the host processor may be information representing the position of the touch on the entire area of the input sensor ISU.

The slave readout circuit ROC_S1 includes a transmitting circuit 210, a receiving circuit 220, a processor 230, a host interface 240, the sensor interface 250, and a memory 260.

The slave readout circuit ROC_S2 includes a transmitting circuit 310, a receiving circuit 320, a processor 330, a host interface 340, the sensor interface 350, and a memory 360.

The host interface 240 in the slave readout circuit ROC_S1 and the host interface 340 in the slave readout circuit ROC_S2 may not perform substantially any operation. Thus, the host interface 240 in the slave readout circuit ROC_S1 and the host interface 340 in the slave readout circuit ROC_S2 may be omitted.

The sensor interface 250 in the slave readout circuit ROC_S1 may communicate with the sensor interface 150 in the master readout circuit ROC_M. The sensor interface 250 receives the first synchronization signal SYNC1 from the sensor interface 150 and provides the first sensing signal SS1 to the sensor interface 150. The first sensing signal SS1 may include a second reception signal RXS2 stored in the memory 260.

The sensor interface 350 in the slave readout circuit ROC_S2 may communicate with the sensor interface 150 in the master readout circuit ROC_M. The sensor interface 350 receives the second synchronization signal SYNC2 from the sensor interface 150 and provides the second sensing signal SS2 to the sensor interface 150. The second sensing signal SS2 may include a third reception signal RXS3 stored in the memory 360.

The master readout circuit ROC_M may store, in the memory 160, the second reception signal RXS2 and the third reception signal RXS3 received from the slave readout circuits ROC_S1 and ROC_S2.

The processor 130 in the master readout circuit ROC_M may calculate touch position information XY, based on the second reception signal RXS2 and the third reception signal RXS3 as well as the first reception signal RXS1.

The master readout circuit ROC_M and the slave readout circuits ROC_S1 and ROC_S2 may each include a clock generator for generating a clock signal and a voltage generator for generating a drive voltage.

As illustrated in FIG. 11, the one master readout circuit ROC_M may communicate with the plurality of slave readout circuits ROC_S1 and ROC_S2.

Figure 12:
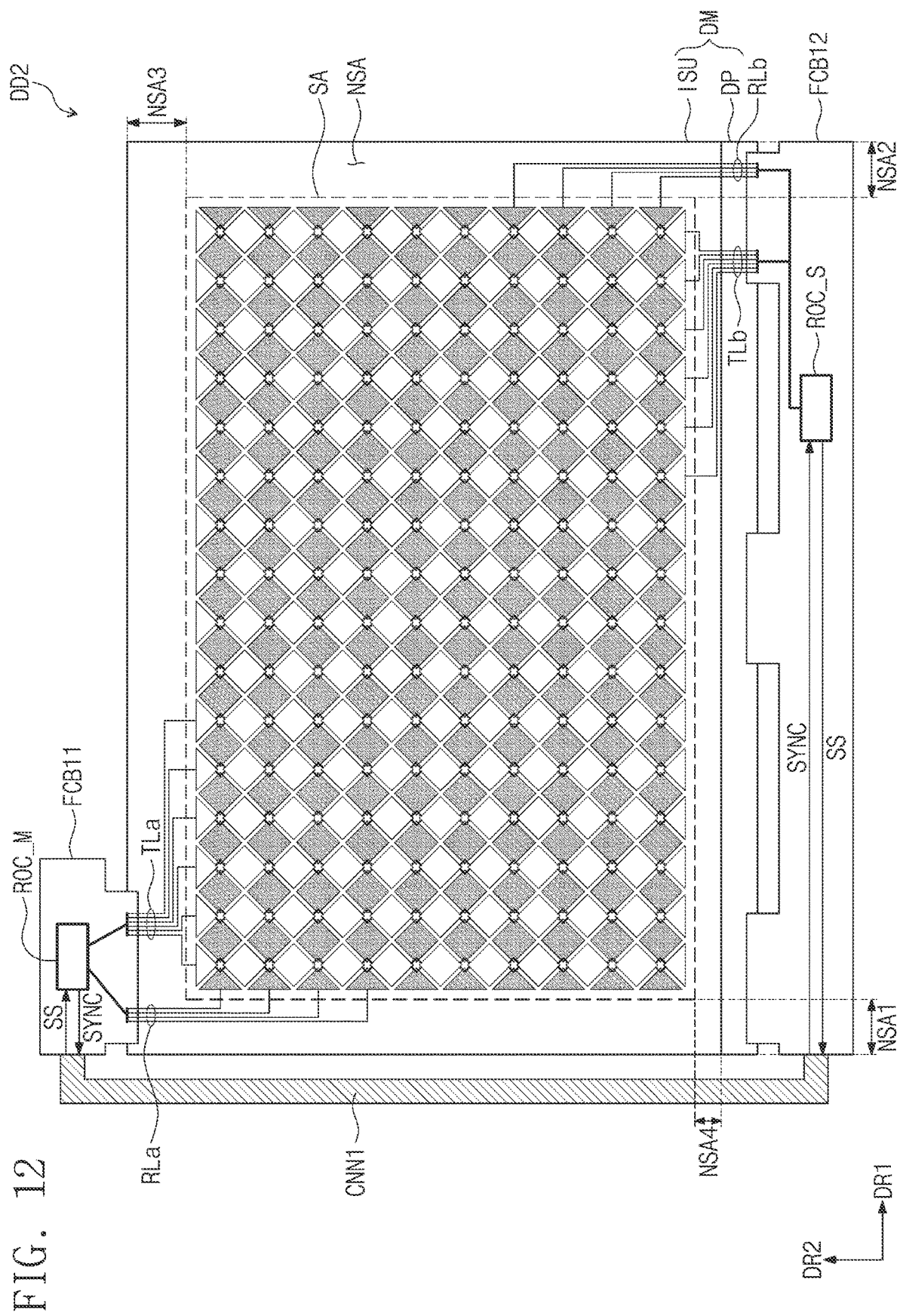
FIG. 12 is a view illustrating a connection relationship between an input sensor, a first circuit board, and a second circuit board according to an embodiment of the present disclosure.

FIG. 12 is a view illustrating a connection relationship between an input sensor ISU, a first circuit board FCB11, and a second circuit board FCB12 according to an embodiment of the present disclosure.

Referring to FIG. 12, a display device DD2 includes a display module DM, the first circuit board FCB11, and the second circuit board FCB12.

The display module DM includes a display panel DP and the input sensor ISU. The input sensor ISU may include a sensing area SA and a non-sensing area NSA. The sensing area SA may be an area activated in response to an electrical signal. For example, the sensing area SA may be an area that senses an input. The non-sensing area NSA may surround the sensing area SA.

The non-sensing area NSA includes first to fourth non-sensing areas NSA1, NSA2, NSA3, and NSA4.

In a position adjacent to the third non-sensing area NSA3, the first circuit board FCB11 may be connected to a first side of the display panel DP. In a position adjacent to the fourth non-sensing area NSA4, the second circuit board FCB12 may be connected to a second side of the display panel DP. A master readout circuit ROC_M of the first circuit board FCB11 and a slave readout circuit ROC_S of the second circuit board FCB12 may be electrically connected with each other through a connecting part CNN1. The connecting part CNN1 may be one of various components for signal transmission, such as a flexible printed circuit board, a wire harness, a signal cable, and the like.

The master readout circuit ROC_M is disposed on the first circuit board FCB11, and the slave readout circuit ROC_S is disposed on the second circuit board FCB12. The master readout circuit ROC_M and the slave readout circuit ROC_S may include the circuit configurations illustrated in FIG. 9.

The master readout circuit ROC_M is electrically connected with receiving lines RLa and transmitting lines TLa.

The slave readout circuit ROC_S is electrically connected with receiving lines RLb and transmitting lines TLb.

The receiving lines RLa may include the first to fifth receiving lines RL1 to RL5 connected to the first to fifth receiving electrodes RE1 to RE5 illustrated in FIG. 6. The receiving lines RLb may include the sixth to tenth receiving lines RL6 to RL10 connected to the sixth to tenth receiving electrodes RE6 to RE10 illustrated in FIG. 6.

The transmitting lines TLa may include the first to eighth transmitting lines TL1 to TL8 connected to the first to eighth transmitting electrodes TE1 to TE8 illustrated in FIG. 6. The transmitting lines TLb may include the ninth to sixteenth transmitting lines TL9 to TL16 connected to the ninth to sixteenth transmitting electrodes TE9 to TE16 illustrated in FIG. 6.

The receiving lines RLa are disposed in the first non-sensing area NSA1, and the receiving lines RLb are disposed in the second non-sensing area NSA2. The transmitting lines TLa are disposed in the third non-sensing area NSA3, and the transmitting lines TLb are disposed in the fourth non-sensing area NSA4.

As the receiving lines RLa and RLb are distributed in the first non-sensing area NSA1 and the second non-sensing area NSA2, the width and spacing of the receiving lines RLa and RLb may be sufficiently secured.

Figure 13:
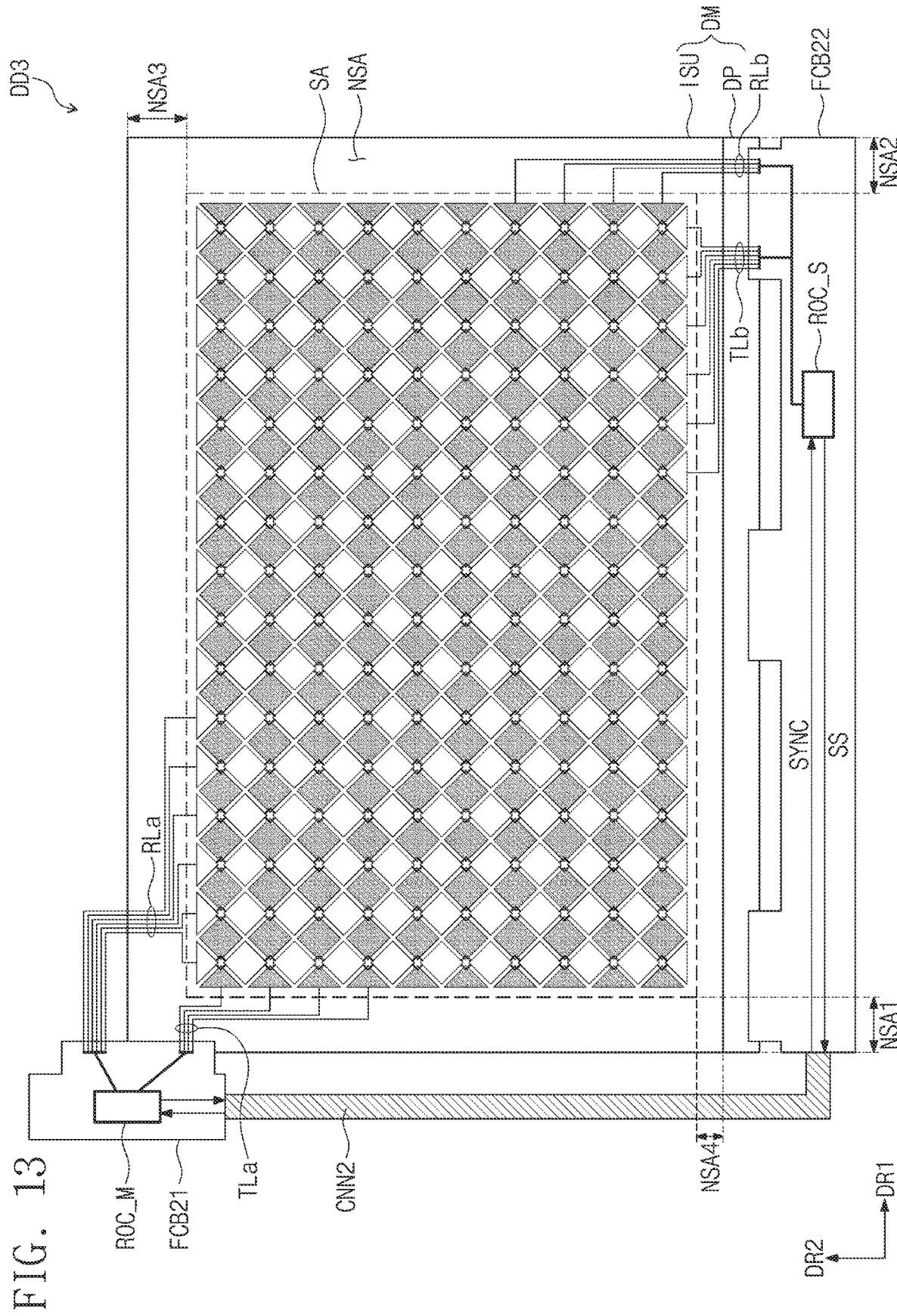
FIG. 13 is a view illustrating a connection relationship between an input sensor, a first circuit board, and a second circuit board according to an embodiment of the present disclosure.

FIG. 13 is a view illustrating a connection relationship between an input sensor ISU, a first circuit board FCB21, and a second circuit board FCB22 according to an embodiment of the present disclosure.

Referring to FIG. 13, a display device DD3 includes a display module DM, the first circuit board FCB21, and the second circuit board FCB22.

The display module DM includes a display panel DP and the input sensor ISU. The input sensor ISU may include a sensing area SA and a non-sensing area NSA. The sensing area SA may be an area activated in response to an electrical signal. For example, the sensing area SA may be an area that senses an input. The non-sensing area NSA may surround the sensing area SA.

The non-sensing area NSA includes first to fourth non-sensing areas NSA1, NSA2, NSA3, and NSA4.

In a position adjacent to the first non-sensing area NSA1, the first circuit board FCB21 may be connected to the display panel DP. In a position adjacent to the fourth non-sensing area NSA4, the second circuit board FCB22 may be connected to the display panel DP. The first circuit board FCB21 and the second circuit board FCB22 may be electrically connected with each other through a connecting part CNN2. The connecting part CNN2 may be one of various components for signal transmission, such as a flexible printed circuit board, a wire harness, a signal cable, and the like.

A master readout circuit ROC_M is disposed on the first circuit board FCB21, and a slave readout circuit ROC_S is disposed on the second circuit board FCB22. The master readout circuit ROC_M and the slave readout circuit ROC_S may include the circuit configurations illustrated in FIG. 9.

The master readout circuit ROC_M is electrically connected with receiving lines RLa and transmitting lines TLa.

The slave readout circuit ROC_S is electrically connected with receiving lines RLb and transmitting lines TLb.

The receiving lines RLa may include the first to fifth receiving lines RL1 to RL5 connected to the first to fifth receiving electrodes illustrated in FIG. 6. The receiving lines RLb may include the sixth to tenth receiving lines RL6 to RL10 connected to the sixth to tenth receiving electrodes RE6 to RE10 illustrated in FIG. 6.

The transmitting lines TLa may include the first to eighth transmitting lines TL1 to TL8 connected to the first to eighth transmitting electrodes TE1 to TE8 illustrated in FIG. 6. The transmitting lines TLb may include the ninth to sixteenth transmitting lines TL9 to TL16 connected to the ninth to sixteenth transmitting electrodes TE9 to TE16 illustrated in FIG. 6.

The receiving lines RLa are disposed in the third non-sensing area NSA3, and the receiving lines RLb are disposed in the second non-sensing area NSA2. The transmitting lines TLa are disposed in the first non-sensing area NSA1, and the transmitting lines TLb are disposed in the fourth non-sensing area NSA4.

As the receiving lines RLa and RLb are distributed in the third non-sensing area NSA3 and the second non-sensing area NSA2, the width and spacing of the receiving lines RLa and RLb may be sufficiently secured.

As illustrated in FIGS. 12 and 13, the master readout circuit ROC_M and the slave readout circuit ROC_S may be disposed on different circuit boards.

The display device having the above-described configuration includes the plurality of readout circuits for sensing a user input. Accordingly, even though the number of transmitting lines and/or the number of receiving lines is increased, the transmitting lines and/or the receiving lines may be distributed and connected to the readout circuits. Thus, the width and spacing of the transmitting lines and/or the receiving lines disposed in the non-sensing area of the input sensor may be sufficiently secured. As a result, deterioration in the quality of the transmission signal transferred to the transmitting lines and/or the reception signal transferred to the receiving lines may be prevented.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:
a display panel;
an input sensor disposed on the display panel, the input sensor including first sensing electrodes and second sensing electrodes, wherein the input sensor includes a sensing area in which the first sensing electrodes and the second sensing electrodes are arranged, a first non-sensing area disposed on a periphery of the sensing area, and a second non-sensing area disposed to be spaced apart from the first non-sensing area with the sensing area disposed between the first non-sensing area and the second non-sensing area;
a first readout circuit electrically connected with the first sensing electrodes and generating first reception signals corresponding to signals received from the first sensing electrodes; and
a second readout circuit electrically connected with the second sensing electrodes and generating second reception signals corresponding to signals received from the second sensing electrodes,
wherein a synchronization signal is supplied from the first readout circuit to the second readout circuit and the second readout circuit operates in response to the synchronization signal supplied from the first readout circuit.

2. The display device of claim 1, wherein the second readout circuit provides a sensing signal corresponding to the second reception signals to the first readout circuit in response to the synchronization signal.

3. The display device of claim 2, wherein the first readout circuit calculates a position of an input on the input sensor based on the first reception signals and the sensing signal.

4. The display device of claim 1, wherein the first readout circuit includes:
a host interface which communicates with a host processor; and
a sensor interface which communicates with the second readout circuit.

5. The display device of claim 1, wherein the second readout circuit includes a sensor interface which communicates with the first readout circuit.

6. The display device of claim 1, further comprising:
first sensing lines which electrically connects the first sensing electrodes and the first readout circuit; and
second sensing lines which electrically connects the second sensing electrodes and the second readout circuit.

7. The display device of claim 6, wherein the first sensing lines are disposed in the first non-sensing area, and the second sensing lines are disposed in the second non-sensing area.

8. The display device of claim 1, further comprising:
a circuit board on which the first readout circuit and the second readout circuit are disposed,
wherein the circuit board is electrically connected with the display panel.

9. The display device of claim 1, further comprising:
a first circuit board on which the first readout circuit is disposed; and
a second circuit board on which the second readout circuit is disposed,
wherein the first circuit board is electrically connected to a first side of the display panel, and the second circuit board is electrically connected to a second side of the display panel, the second side being different from the first side.

10. The display device of claim 9, wherein the first readout circuit disposed on the first circuit board and the second readout circuit disposed on the second circuit board are electrically connected through a connecting part.

11. A display device comprising:
a display panel;
an input sensor disposed on the display panel, the input sensor including first receiving electrodes and second receiving electrodes wherein the input sensor includes a sensing area in which the first receiving electrodes and the second receiving electrodes are arranged, a first non-sensing area disposed on a periphery of the sensing area, and a second non-sensing area disposed to be spaced apart from the first non-sensing area with the sensing area disposed between the first non-sensing area and the second non-sensing area;
a first readout circuit electrically connected with the first receiving electrodes and generating first reception signals corresponding to signals received from the first receiving electrodes;
a second readout circuit electrically connected with the second receiving electrodes and generating second reception signals corresponding to signals received from the second receiving electrodes;
a first circuit board on which the first readout circuit is disposed; and
a second circuit board on which the second readout circuit is disposed,
wherein a synchronization signal is supplied from the first readout circuit to the second readout circuit and the second readout circuit operates in response to the synchronization signal supplied from the first readout circuit.

12. The display device of claim 11, wherein the second readout circuit provides a sensing signal corresponding to the second reception signals to the first readout circuit in response to the synchronization signal supplied from the first readout circuit.

13. The display device of claim 11, wherein the first readout circuit disposed on the first circuit board and the second readout circuit disposed on the second circuit board are electrically connected through a connecting part.

14. The display device of claim 12, wherein the first readout circuit calculates a position of an input on the input sensor based on the first reception signals and the sensing signal.

15. The display device of claim 11, wherein the first circuit board is electrically connected to a first side of the display panel and the second circuit board is electrically connected to a second side of the display panel, the second side being different from the first side.

16. The display device of claim 12, wherein the input sensor further includes:
first transmitting electrodes electrically connected with the first readout circuit; and
second transmitting electrodes electrically connected with the second readout circuit.

17. The display device of claim 16, wherein the first readout circuit includes:
a first transmitting circuit which outputs first transmission signals to the first transmitting electrodes;
a first receiving circuit which receives the first reception signals from the first receiving electrodes;
a first memory which stores the first reception signals;
a host interface which communicates with a host processor;
a first sensor interface which transmits a synchronization signal to the second readout circuit; and
a first processor which controls the first transmitting circuit, the first memory, the host interface, and the first sensor interface.

18. The display device of claim 17, wherein the second readout circuit includes:
a second transmitting circuit which outputs second transmission signals to the second transmitting electrodes;
a second receiving circuit which receives the second reception signals from the second receiving electrodes;
a second memory which stores the second reception signals;
a second sensor interface which transmits the sensing signal corresponding to the second reception signals stored in the second memory to the first sensor interface of the first readout circuit; and
a second processor which controls the second transmitting circuit, the second memory, and the second sensor interface.

19. A method for operating a display device, the method comprising:
transmitting a first transmission signal from a first readout circuit to an input sensor;
receiving, by the first readout circuit, a first input signal for the first transmission signal from the input sensor;
receiving, by a second readout circuit, a second input signal for the first transmission signal from the input sensor;
transmitting a second transmission signal from the second readout circuit to the input sensor;
receiving, by the first readout circuit, the first input signal for the second transmission signal from the input sensor;
receiving, by the second readout circuit, the second input signal for the second transmission signal from the input sensor;
transmitting a sensing signal corresponding to the second input signal for the first transmission signal and the second input signal for the second transmission signal from the second readout circuit to the first readout circuit; and
calculating, by the first readout circuit, a position of a touch corresponding to the first input signal and the second input signal for the first transmission signal and the second transmission signal,
wherein a synchronization signal is supplied from the first readout circuit to the second readout circuit and the second readout circuit operates in response to the synchronization signal supplied from the first readout circuit.

* * * * *